United States Patent [19]

Mitsutake et al.

[11] Patent Number: 5,387,991
[45] Date of Patent: Feb. 7, 1995

[54] POLARIZATION CONVERTING DEVICE AND POLARIZED-LIGHT ILLUMINATING SYSTEM USING THE DEVICE AND IMAGE DISPLAY UNIT USING THE DEVICE

[75] Inventors: Hideaki Mitsutake, Tokyo; Shigeru Kawasaki, Atsugi, both of Japan

[73] Assignee: Canon Kabushiki Kaisha, Tokyo, Japan

[21] Appl. No.: 988,018

[22] Filed: Dec. 9, 1992

Related U.S. Application Data

[63] Continuation of Ser. No. 702,589, May 17, 1991, abandoned.

[30] Foreign Application Priority Data

| | | | |
|---|---|---|---|
| May 18, 1990 | [JP] | Japan | 2-126752 |
| Oct. 5, 1990 | [JP] | Japan | 2-266346 |
| May 14, 1991 | [JP] | Japan | 3-136945 |

[51] Int. Cl.⁶ ............ G02F 1/137; G02F 1/1335
[52] U.S. Cl. ............ 359/93; 359/40; 359/49; 359/70; 359/73; 359/487; 359/496; 359/499
[58] Field of Search ............ 359/93, 73, 40, 49, 359/66, 70, 490, 495, 496, 499, 831, 833, 834, 837, 487

[56] References Cited

U.S. PATENT DOCUMENTS

| | | | |
|---|---|---|---|
| 4,516,837 | 5/1985 | Soref et al. | 359/40 |
| 4,824,214 | 4/1989 | Ledebuhr | 359/40 |
| 4,913,529 | 4/1990 | Goldenberg et al. | 359/63 |
| 4,989,076 | 1/1991 | Owada et al. | 359/70 |
| 5,042,921 | 8/1991 | Sato et al. | 359/49 |

FOREIGN PATENT DOCUMENTS

| | | |
|---|---|---|
| 0040033 | 11/1981 | European Pat. Off. |
| 0434041 | 6/1991 | European Pat. Off. |
| 0443586 | 8/1991 | European Pat. Off. |
| 2658925 | 8/1991 | France |
| 43569 | 6/1888 | Germany |
| 3829598 | 3/1990 | Germany |

OTHER PUBLICATIONS

Patent Abstract of Japan, vol. 9, No. 199 (P-380) [1922] Aug. 16, 1985.

*Primary Examiner*—William L. Sikes
*Assistant Examiner*—Huy Mai
*Attorney, Agent, or Firm*—Morgan & Finnegan

[57] ABSTRACT

A polarization converting device for converting a light from a light source into a polarized light comprises a first prism having a first slant plane for receiving the light from the light source and dividing it into first and second lights with their polarized planes orthogonal, a first emergent surface from which the first light exits, and a second emergent surface from which the second light exits, a second prism having an incident surface opposed to the second emergent surface of the first prism, a second slant plane for reflecting and deflecting the second light from the incident surface so as to direct it to an optical path almost parallel to that of the first light, and a third emergent surface from which the second light reflected from the second slant plane exits, and a transparent layer carried between the second emergent surface of the first prism and the incident surface of the second prism, the transparent layer having a smaller refractive index than the first prism.

56 Claims, 12 Drawing Sheets

POLARIZATION CONVERTING DEVICE AND POLARIZED-LIGHT ILLUMINATING SYSTEM USING THE DEVICE AND IMAGE DISPLAY UNIT USING THE DEVICE

This is a continuation of co-pending application Ser. No. 07/702,589, filed on May 17, 1991 now abandoned.

BACKGROUND OF THE INVENTION

1. Field of the Invention

The present invention relates to a polarization converting device, a polarized light illuminating system using the device and an image display unit using the device.

2. Related Background Art

FIG. 1 is a constitutional view showing a conventional example of a projection type display unit.

This projection type display unit comprises a light source 1 consisting of a tungsten halogen lamp or metal halide lamp, a reflection mirror 2 for reflecting a part of light emitted from the light source 1, a heat ray cut filter 3 for absorbing or reflecting the heat ray of light incident thereupon directly or via the reflection mirror 2 from the light source 1, a condenser lens 4 for transforming the light after removing the heat ray to parallel light, a polarizing plate 5 for transforming the parallel light to linear polarized light, a liquid crystal light bulb 7 for modulating the linear polarized light in accordance with an image signal, a polarizing plate 8 for transimtting only component lying in a direction of transmission axis for the modulated linear polarized light, and a projection lens system 10 for projecting on larger scale the transmitted linear polarized light on to a screen, not shown.

FIG. 2 is a constitutional view showing another conventional example of a projection type display unit.

This projection type display unit has two polarizing beam splitters 6, 9 disposed before and after a liquid crystal light bulb 7, respectively, instead of two polarizing plates 5, 8 of the projection type display unit as shown in FIG. 1.

The projection type display unit as shown in FIGS. 1 and 2 has such a disadvantage that a linear polarized light component emitted from the light source 1 and transmitted through the polarizing plate 5 or the polarizing beam splitter 6 is only used for lighting the liquid crystal light bulb 7, and a linear polarized light component orthogonal to the above linear polarized light component is lost, so that the utilization efficiency of light is reduced to less than 50%.

A projection type display unit which improves the above disadvantage is that as described in Japanese Laid-Open Application No. 61-90584, as shown in FIG. 3.

In this projection type display unit, parallel light emerging through the condenser lens 4 enters a polarizing beam splitter 11, wherein its P polarized light component Lp is transmitted directly through an action surface 11a (a deposition film formed on a slant plane having two rectangular prisms bonded with each other) of the polarizing beam splitter 11, while its S polarized light component Ls is reflected therefrom at right angle and enters a total reflection prism 12. The S polarized light component Ls is reflected again at right angle by the total reflection prism 12 to emerge therefrom in the same direction as that of the P polarized light component Lp transmitted through the polarizing beam splitter 11. It is noted that the S polarized light component Ls is a polarized light component parallel to the action surface 11a of polarizing beam splitter 11, and the P polarized light component Lp is that orthogonal to the S polarized light component.

On the emergent side of the total reflection prism 12, a λ/2 optical phase plate 13 is disposed, in which the S polarized light component Ls emerging from the total reflection prism 12 has its polarized direction rotated 90° by the λ/2 optical phase plate 13 and is converted to a P polarized light component Lp*. On the light emergent side of the polarizing beam splitter 11 and the λ/2 optical phase plate 13 are disposed wedge lenses 14, 15 for changing the optical path, whereby each optical path for the P polarized light component Lp transmitted through the polarizing beam splitter 11 and the P polarized light component Lp* converted by the λ/2 optical phase plate 13 is deflected and built up in such a manner as to intersect at a point $P_O$ on an incident side of the liquid crystal light bulb 7.

Accordingly, this projection type display units has a utilization efficiency of light twice as great as that as shown in FIGS. 1 and 2, because the liquid crystal light bulb 7 is illuminated with both the S polarized light component Ls and the P polarized light component Lp which are separated by the polarizing beam splitter 11.

As to the above projection type display unit as disclosed in Japanese Laid-Open Patent Application No. 61-90584, there is a problem that the light source 1 is usually made of a lamp, which is not a complete point or line light source, so that the light emerging from the condenser lens 4 is not completely parallel, and the P polarized light component Lp and the converted P polarized light component Lp* are not made parallel completely.

That problem will be described below with reference to FIG. 4.

The light emitted from the light source 1 having a finite diameter φ is converged by the condenser lens 4 disposed a distance 1 apart therefrom, but the emergent ray therefrom is not rendered a parallel light completely, producing unparallel light dispersed over a range of an angle 2ω ($\omega=\tan^{-1}((\phi/2)/1)$). A light ray α of Unparallel light is not influenced by the polarizing beam splitter 11, but passes through an interface between the polarizing beam splitter 11 and the prism 12 to enter the λ/2 optical phase plate 13 and emerges therefrom as the ray containing both the S polarized light component and the P polarized light component. Also, a light ray β is made the S polarized light component Ls at the polarizing beam splitter 11, in which after reflecting from the total reflection prism 12, it passes through the interface between the polarizing beam splitter 11 and the prism 12, and is reflected again by the polarizing beam splitter 11 so as to exit from the λ/2 optical phase plate 13 as the P polarized light component Lp* at a quite different position as indicated by a light ray $β_1$, or be absorbed into an interface of the λ/2 optical phase plate 13 or transmitted directly as indicated by a light ray $β_2$ in FIG. 4, thereby being lost.

SUMMARY OF THE INVENTION

The present invention was fulfilled in view of the above conventional problems to provide an improved polarization converting device, an improved polarized light illuminating system, and an improved image display unit.

A first form of a polarization converting device according to the present invention comprises a first prism having a first slant plane for receiving the light from a light source and dividing it into first and second lights with their polarized planes orthogonal, a first emergent surface from which said first light exits, and a second emergent surface from which said second light exits, a second prism having an incident surface opposed to said second emergent surface of said first prism, a second slant plane for reflecting and deflecting said second light from said incident surface so as to direct it to an optical path almost parallel to that of said first light, and a third emergent surface from which said second light exits, and a transparent layer carried between said second emergent surface of said first prism and said incident surface of said second prism, said transparent layer having a smaller refractive index than said first prism.

Furthermore, a second form of a polarization converting device according to the present invention comprises a first prism having a first slant plane for receiving the light from a light source and dividing it into first and second lights with their polarized planes orthogonal, a first emergent surface from which said first light exits, and a second emergent surface from which said second light exits, and a second prism having an incident surface substantially in contact with said second emergent surface of said first prism, a second slant plane for reflecting and deflecting said second light from said incident surface so as to direct it to an optical path almost parallel to that of said first light, and a third emergent surface from which said second light reflected from said second slant plane exits, said second prism having a smaller refractive index than said first prism.

A first form of a polarized light illuminating system according to the present invention comprises a light source, a first prism having a first slant plane for receiving the light from said light source and dividing it into first and second lights with their polarized planes orthogonal, a first emergent surface from which said first light exits, and a second emergent surface from which said second light exits, a second prism having an incident surface opposed to said second emergent surface of said first prism, a second slant plane for reflecting and deflecting said second light from said incident surface so as to direct it to an optical path almost parallel to that of said first light, and a third emergent surface from which said second light reflected from said second slant plane exits, means for modulating at least one polarized plane for said first and second lights so that the polarized planes for said first and second lights are almost coincident, and a transparent layer carried between said second emergent surface of said first prism and said incident surface of said second prism, said transparent layer having a smaller refractive index than said first prism.

Further, a second form of a polarized light illuminating system according to the present invention comprises a light source, a first prism having a first slant plane for receiving the light from said light source and dividing it into first and second lights with their polarized planes orthogonal, a first emergent surface from which said first light exits, and a second emergent surface from which said second light exits, and a second prism having an incident surface substantially in contact with said second emergent surface of said first prism, a second slant plane for reflecting and deflecting said second light from said incident surface so as to direct it to an optical path almost parallel to that of said first light, and a third emergent surface from which said second light reflected from said second slant plane exits, said second prism having a smaller refractive index than said first prism, and further including means for modulating at least one polarized plane for said first and second lights so that the polarized planes for said first and second lights are almost coincident.

A first form of an image display unit according to the present invention comprises a light source and a lighting optical system, said lighting optical system including a first prism having a first slant plane for receiving the light from said light source and dividing it into first and second lights with their polarized planes orthogonal, a first emergent surface from which said first light exits, and a second emergent surface from which said second light exits, a second prism having an incident surface opposed to said second emergent surface of said first prism, a second slant plane for reflecting and deflecting said second light from said incident surface so as to direct it to an optical path almost parallel to that of said first light, and a third emergent surface from which said second light reflected from said second slant plane exits, means for modulating at least one polarized plane for said first and second lights so that the polarized planes for said first and second lights are almost coincident, and a transparent layer carried between said second emergent surface of said first prism and said incident surface of said second prism, said transparent layer having a smaller refractive index than said first prism, and further including means for producing an image by modulating said first light and said second light from said illuminating optical system.

Furthermore, a second form of an image dispaly unit according to the present invention comprises a light source and a lighting optical system, said lighting optical system including a first prism having a first slant plane for receiving the light from said light source and dividing it into first and second lights with their polarized planes orthogonal, a first emergent surface from which said first light exits, and a second emergent surface from which said second light exits, a second prism having a second incident surface substantially in contact with said second emergent surface of said first prism, a second plane for reflecting and deflecting said second light from said second incident surface so as to direct it to an optical path almost parallel to that of said first light, and a third emergent surface from which said second light reflected from said second slant plane exits, said second prism having a smaller refractive index than said first prism, and means for modulating at least one polarized plane for said first and second lights so that the polarized planes for said first and second lights are almost coincident, and further including means for producing an image by modulating said first light and said second light from said illuminating optical system.

A specific form of the present invention will become apparent in the following example, but the form as disclosed in the present application is only by way of example according to the present invention, whereby it is possible to provide various forms based on a concept of the present invention.

BRIEF DESCRIPTION OF THE DRAWINGS

FIGS. 8A and 8B are views showing essential parts of an example of a projection type display unit having the polarized light illuminating system as shown in FIG. 5, wherein FIG. 8A is a side view and FIG. 8B is an upper view.

FIGS. 13A and 13B are views showing essential parts of an example of a projection type display unit having the polarized light illuminating system as shown in FIG. 9, wherein FIG. 13A is a side view and FIG. 13B is an upper view.

DESCRIPTION OF THE PREFERRED EMBODIMENTS

An Example of the present invention will be described with reference to the drawings.

Figure 6:
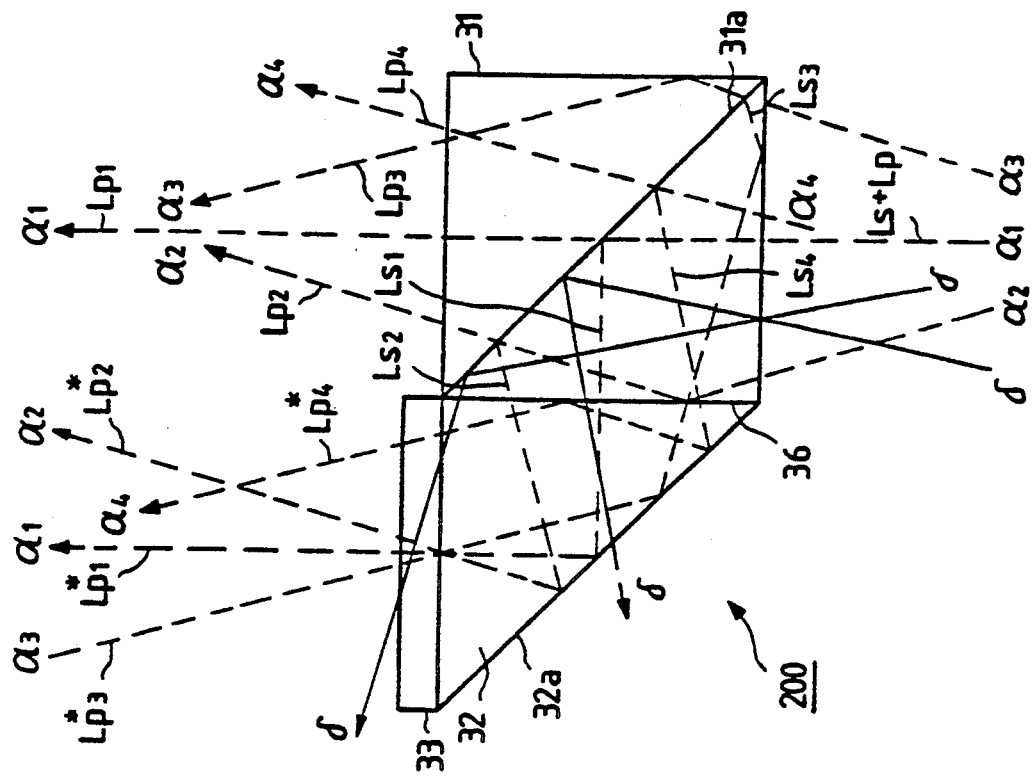
FIG. 6 is a view for explaining the optical path on the polarized light illuminating system as shown in FIG. 5.
Figure 5:
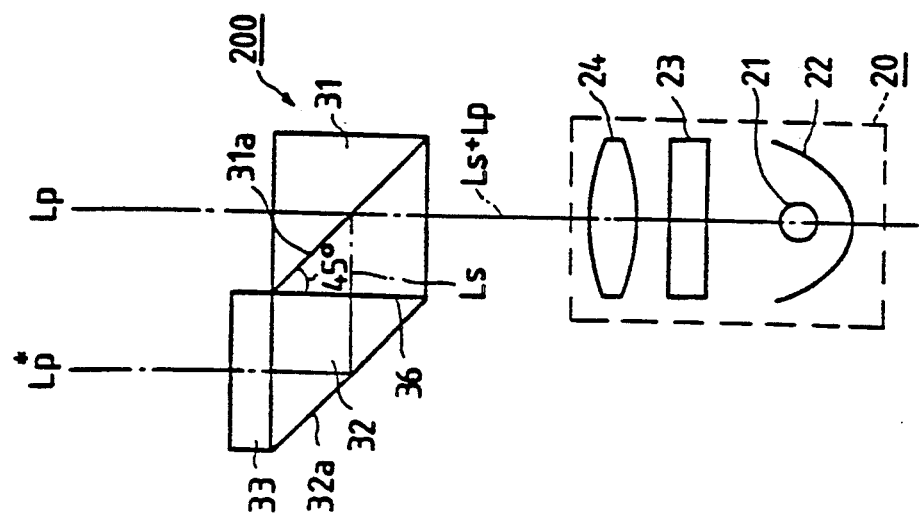
FIG. 5 is a constitutional view showing a first example of a polarized light illuminating system according to the present invention.

FIG. 5 is a constitutional view showing a first example of a polarized light illuminating system according to the present invention, and FIG. 6 is a view for explaining the optical path on the polarized light illuminating system as shown in FIG. 5.

The light incident upon a polarization converting device 200 is emitted from a light source unit 20 comprising a light source 21 consisting of a tungsten halogen lamp or metal halide lamp, a reflection mirror 22 for reflecting a part of light emitted from the light source 21, a heat ray cut filter 23 for absorbing or reflecting the heat ray of light incident thereupon directly or via the reflection mirror 22 from the light source 21, and a condenser lens 24 for transforming the light after removal of said heat ray to parallel light.

Figure 3:
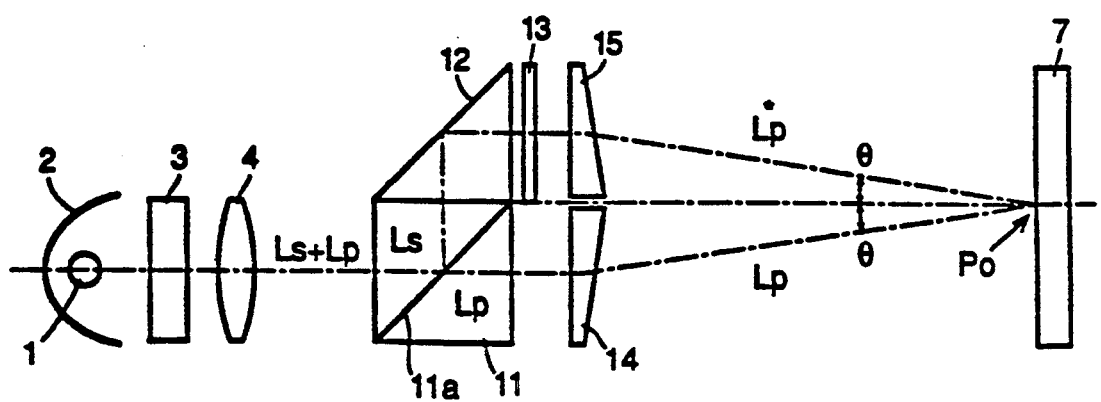
FIG. 3 is a constitutional view showing a projection type display unit as disclosed in Japanese Laid-Open Patent Application No. 61-90584.

The polarization converting device 200 of this example comprises a polarizing beam splitter 31 having an action slant plane 31a (a deposition film formed on a slant plane having two rectangular prisms bonded with each other) which transmits he P polarized light component Lp of parallel light from the incident light and reflects the S polarized light component Ls of parallel light at right angle, a total reflection prism 32 having a total reflection slant plane 32a parallel to the action plane 31a of the polarizing beam splitter 31 which is a reflecting member for reflecting the reflected S polarized light component Ls at right angle, and a λ/2 optical phase plate 33 upon which the S polarized light component Ls reflected from the slant plane 32a of the total reflection prism 32 is incident at right angle, the λ/2 optical phase plate 33 serving to convert the S polarized light component Ls reflected from the slant plane 32a of the total reflection prism 32 to the P polarized light component Lp* emergent therefrom, like the conventional one as shown in FIG. 3. However, in this case, an optical multi-layer film 36, which has a surface upon which the S polarized light component Ls reflected from the action slant plane 31a of the polarizing beam splitter 31 is incident at a right angle, with a characteristic of transmitting the light with smaller incident angle and reflecting the light with larger incident angle, and including at least one layer with a refractive index smaller than that of a glass that is a member of the polarizing beam splitter 31, is provided between the action slant plane 31a of the polarizing beam splitter 31 and the total reflection slant plane 32a of the total reflection prism 32, this film 36 being sandwiched between an emergent surface of the S polarized light component Ls from the polarizing beam splitter 31 and an incident surface of the S polarized light component Ls into the prism 32.

Accordingly, the polarizing light illuminating system of this example is different from the conventional one as shown in FIG. 3 in the following two points.

(1) The wedge lenses 14, 15 on the emergent side of the polarizing beam splitter 11 as shown in FIG. 3 is not provided in this example.

(2) To emit unparallel incident light as the ordinary ray, there is provided the optical multi-layer film 36 having a characteristic of transmitting the light with smaller incident angle and reflecting the light with larger incident angle between the action slant plane 31a of the polarizing beam splitter 31 and the total reflection slant plane 32a of the total reflection prism 32.

An advantage of (2) as above indicated will be detailed by showing the optical path for various light rays propagating within the device 200, with reference to FIG. 6.

(1) Optical path for the light (light ray $\alpha^1$) incident at right angle upon an incident surface of the polarizing beam splitter 31.

Among the light incident from the condenser lens 24 upon the polarizing beam splitter 31, the light as indicated by a light ray $\alpha_1$ incident at right angle upon the incident surface of the polarizing beam splitter 31 includes the S polarized light component $Ls_1$ reflected through a right angle from the action slant plane 31a of the polarizing beam splitter 31 and the P polarized light component $Lp_1$ transmitted through the action slant plane 31a. The reflected S polarized light component $Ls_1$ enters the optical multi-layer film 36 at right angle via one emergent surface of the polarizing beam splitter 31, passing through the optical multi-layer film 36 into an incident surface of the total reflection prism 32, and after being reflected from the total reflection plane 32a of the total reflection prism 32, it enters the λ/2 optical phase plate 33 via an emergent surface of the total reflection prism 32 to be converted into the P polarized light component $Lp_1^*$ with the plate 33 and emitted in a predetermined direction. On the other hand, the P polarized light component $Lp_1$ transmitted through the action slant plane 31a exits directly from the other emergent surface of the polarizing beam splitter 31.

(2) Optical path of the light (light ray $\alpha_2$) incident at larger incident angle upon the optical multi-layer film 36.

Among the light incident from the condenser lens 24 upon the polarizing beam splitter 31, a light ray λ/2 incident at larger angle directly upon the optical multi-layer film 36 is reflected from the optical multi-layer film 36, with its S polarized light component $Ls_2$ reflected from the action slant plane 31a of the polarizing beam splitter 31, and its P polarized light component $Lp_2$ passing through the action slant plane 31a. The reflected S polarized light component $Ls_2$ enters again the optical multi-layer film 36 via one emergent surface of the polarizing beam splitter 31, and owing to small incident angle, passes directly through the optical multi-layer film 36 into an incident surface of the total reflection prism 32, and after being reflected from the total reflection slant plane 32a of the total reflection prism 32, it enters the λ/2 optical phase plate 33 via an emergent surface of the total reflection prism 32 to be converted into the P polarized light component $Lp_2^*$ with the plate 33 and emitted therefrom. On the other hand, the P polarized light component $Lp_2$ passing through the action slant plane 31a exits directly from the other emergent surface of the polarizing beam splitter 31.

(3) Optical path of the light (light ray $\alpha_3$) incident at larger incident angle upon a plane opposite to the optical multi-layer film 36 of the polarizing beam splitter 31.

Among the light incident from the condenser lens 24 upon the polarizing beam splitter 31, a light ray $\alpha_3$ incident at larger incident angle upon a plane opposite to the optical multi-layer film 36 of the polarizing beam splitter 31 includes its S polarized light component $Ls_3$ reflected from the action slant plane 31a of the polarizing beam splitter 31 and its P polarized light component $Lp_3$ passing through the action slant plane 31a. The reflected S polarized light component $Ls_3$ enters the optical multi-layer film 36 at smaller incident angle via one emergent surface of the polarizing beam splitter 31, passing through the optical multi-layer film 36 into an incident surface of the total reflection prism 32, and after being reflected from the total reflection slant plane 32a of the total reflection prism 32, it enters the λ/2 optical phase plate 33 via an emergent surface of the total reflection prism 32 to be converted into the P polarized light component $Lp_3^*$ with the plate 33 and emitted therefrom. On the other hand, the P polarized light component $Lp_3$ passing through the action slant plane 31a exits from the other emergent surface of the polarizing beam splitter 31.

(4) Optical path of the light (light ray $\alpha_4$) incident obliquely upon a plane opposite to the optical multi-layer film 36 of the polarizing beam splitter 31 at a central portion of an incident surface of the polarizing beam splitter 31.

Among the light incident from the condenser lens 24 into the polarizing beam splitter 31, a light ray $\alpha_4$ incident obliquely upon a plane opposite to the optical multi-layer film 36 of the polarizing beam splitter 31 at a central portion of an incident surface of the polarizing beam splitter 31 includes its S polarized light component $Ls_4$ reflected from the action slant plane 31a of the polarizing beam splitter 31, and its P polarized light component $Lp_4$ passing through the action slant plane 31a. The reflected S polarized light component $Ls_4$ enters the optical multi-layer film 36 at smaller incident angle via one emergent surface of the polarizing beam splitter 31, passing through the optical multi-layer film 36 into an incident surface of the total reflection prism 32, and after being reflected from the total reflection slant plane 32a of the total reflection prism 32, it enters the optical multi-layer film 36 again, owing to larger incident angle, is reflected from the optical multi-layer film 36, and then enters the λ/2 optical phase plate 33 via an emergent surface of the total reflection prism 32 to be converted into the P polarized light component $Lp_4^*$ with the plate 33 and emitted therefrom. On the other hand, the P polarized light component $Lp_4$ passing through the action slant plane 31a exits directly from the emergent surface of the polarizing beam splitter 31.

In this way, the device of this example reflects totally the light rays $\alpha_1-\alpha_4$ at an interface between the polarizing beam splitter 31 and the total reflection prism 32 to determine an angle of divergence ($\omega$) from divergent light flux incident upon the device 200. The optical multi-layer film 36 forming this interface has at least one low refractive index film (e.g., $MgF_2$ film), which is selectively arranged from form A of disposing that film most closely to the polarizing beam splitter 31, form B of sandwiching that film between films of high refractive indices, or form C of disposing that film most closely to the total reflection prism 32. In this example, assuming the refractive index of this film to be $n_0$, that of a medium for higher refractive index film closer to the polarizing beam splitter 31 than this film or a medium for the polarizing beam splitter 31 to be $n_1$, and the angle of incidence of the light ray $\alpha_2$ upon the medium to be $\theta$ (the angle of divergence for the light Lp+Ls within the medium $\omega$), aforementioned actions and effects can be obtained in such a manner as to satisfy the expression, $$0 < n_0/n_1 \leq \cos\theta (=\cos\omega)$$

Also, in the above forms B and C, a form can be taken in which the refractive index of a film (usually one layer) between the low refractive index film and the polarizing beam splitter is made approximately coincident with that of the polarizing beam splitter 31.

In the polarizing converting device, among the incident light upon the polarizing beam splitter 31, as a light ray γ shown in FIG. 6, the light entering obliquely the λ/2 optical phase plate 33 in greatly inclined way may be lost due to transmission or absorption through the λ/2 optical phase plate 33, but it is possible to avoid or reduce the loss of light by forming an optical multi-layer film for reflecting the light with large angle of incidence such as the light ray γ and transmitting the ordinary light with small angle of incidence on the interface between the λ/2 optical phase plate 33 and the total reflection prism 32.

Moreover, among the incident light upon the polarizing beam splitter 31, as a light ray δ shown in FIG. 6, the light entering the total reflection slant plane 32a of the total reflection prism 32 at a less angle than the total reflection angle may experience the loss of light quantity with the S polarized light componnet Ls, because a part of the light may pass through the plate 32a, but it is also possible to avoid the loss of light by forming an optical multi-layer reflection film or metallic reflection film on the total reflection surface 32a.

As above described, with this polarized light illuminating system, it is possible to utilize both the P polarized light component Lp and the S polarized light component Ls which are separated by the polarizing beam splitter 31 to illuminate the light bulb, not shown, so that the utilization efficiency of light can be improved. Also, by illuminating in parallel the light bulb with the lights Lp, Lp*, it is possible to shorten the distance between the polarized light illuminating system and the light bulb, which was difficult to resolve with previous method of illuminating the light bulb with the synthetic light as shown in FIG. 3, and further to miniaturize the projection type display unit having the polarized light illuminating system.

In this polarized light illuminating system, the λ/2 optical phase plate 33 was provided on the side of the emergent surface of the total reflection prism 32, but it may be also provided on the side of the other emergent surface of the polarizing beam splitter 31. In this case, from the emergent surface of the total reflection prism 32, the S polarized light component of light incident upon the device 200 exits, and from the emergent surface of the λ/2 optical phase plate 33, the S polarized light component to which the P polarized light component of light incident upon the device 200 is converted exits.

Figure 7:
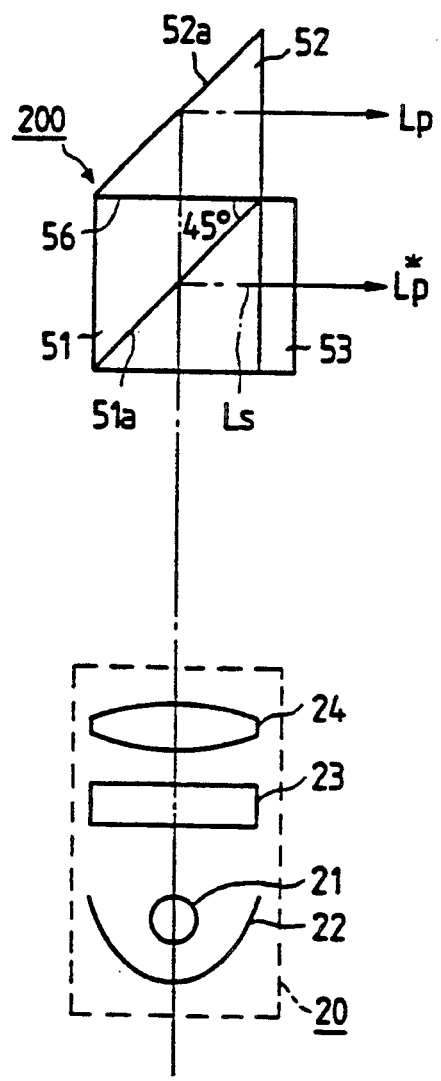
FIG. 7 is a constitutional view showing a second example of a polarized light illuminating system according to the present invention.

FIG. 7 is a constitutional view of essential parts showing a second example of a polarized light illuminating system according to the present invention.

The incident light upon a polarization converting device 200 is emitted from a light source unit 20 comprising a light source 21 consisting of a tungsten halogen lamp or metal halide lamp, a reflection mirror 22 for reflecting a part of light emitted from the light source 21, a heat ray cut filter 23 for absorbing or reflecting the heat ray of light incident thereupon directly or via the reflection mirror 22 from the light source 21, and a condenser lens 24 for transforming the light after removal of the heat ray to parallel light, like in the first example.

The polarization converting device 200 of this example comprises a polarizing beam splitter 51 having an action slant plane 51a (a deposition film formed on a slant plane having two rectangular prisms bonded with each other) which transmits the P polarized light component Lp of parallel light from the incident light and reflects the S polarized light component Ls of parallel light at right angle, a total reflection prism 52 having a total reflection slant plane 52a parallel to the action slant plane 51a of the polarizing beam splitter 51 which is a reflecting member for reflecting the transmitted P polarized light component Lp at right angle, and a λ/2 optical phase plate 53 which the S polarized light component Ls reflected from the action slant plane 51a of the polarizing beam splitter 51 enters at right angle, the λ/2 optical phase plate 53 serving to convert the S polarized light component Ls reflected from the action slant plane 51a of the polarizing beam splitter 51 to the P polarized light component Lp* emergent therefrom. And this device 200 comprises an optical multi-layer film 56 having a surface upon which the transmitted P polarized light component Lp is incident at right angle, with a characteristic of transmitting the light with smaller incident angle and reflecting the light with larger incident angle, and including at least one layer with a refractive index smaller than that of a glass that is a member of the polarizing beam splitter 51, the film 56 being provided between the action plane 51a of the polarizing beam splitter 51 and the total reflection plane 52a of the total reflection prism 52, and particularly, between one emergent surface of the polarizing beam splitter 51 and an incident surface of the total reflection prism 52.

This device 200 differs from that of FIG. 5 in that the directions of incident and emergent lights on the device 200 are rendered orthogonal in such a manner as to cause the P polarized light component Lp transmitted through the action slant plane 51a of the polarizing beam splitter 51 to be incident via one emergent surface of the polarizing beam splitter 51 upon the optical multi-layer film 56 at right angle, then enter an incident surface of the total reflection prism 52, be reflected at right angle at the total reflection slant plane 52a, and emerge from an emergent surface of the total reflection prism 52, while causing the S polarized light component Ls reflected from the action slant plane 51a of the polarizing beam splitter 51 to be incident via the other emergent surface of the polarizing beam splitter 51 upon the λ/2 optical phase plate 53 to be converted to the P polarized light component Lp* and emitted from the plate 53. That is, the optical axis of the light source unit 20 is bent by the device 200.

In this example, since the light passed from the condenser lens 24 is not a complete parallel light, even if a part of the P polarized light component Lp transmitted through the action slant plane 51a of the polarizing beam splitter 51 and reflected from the total reflection slant plane 52a is incident upon the optical multi-layer film 56 at a larger incident angle (corresponding to the light ray α4 as shown in FIG. 6), it is reflected at the optical multi-layer film 56 to exit from the emergent surface of the total reflection prism 52, so that the same effects as those for the polarizing light illuminating system as shown in FIG. 5 can be obtained. The constitution of this optical multi-layer film 56 is the same as the optical multi-layer film 36 of the example as shown in FIGS. 5 and 6.

In the polarizing light illuminating system of the present example, the λ/2 optical phase plate 53 is provided on the emergent surface side of the polarizing beam splitter 51, but it may be provided on the emergent surface side of the total reflection prism 52. In this case, from the emergent surface of the polarizing beam splitter 51, the S polarizing light component of the light incident upon the device 200 exits, while from the emergent surface of the λ/2 optical phase plate 33, the S polarizing light component converted from the P polarizing light component of the light incident upon the device 200 exits.

Next, an example of the projection type display unit will be described in which the polarized light illuminating system of the present invention is combined with other optical devices.

Figure 8A:
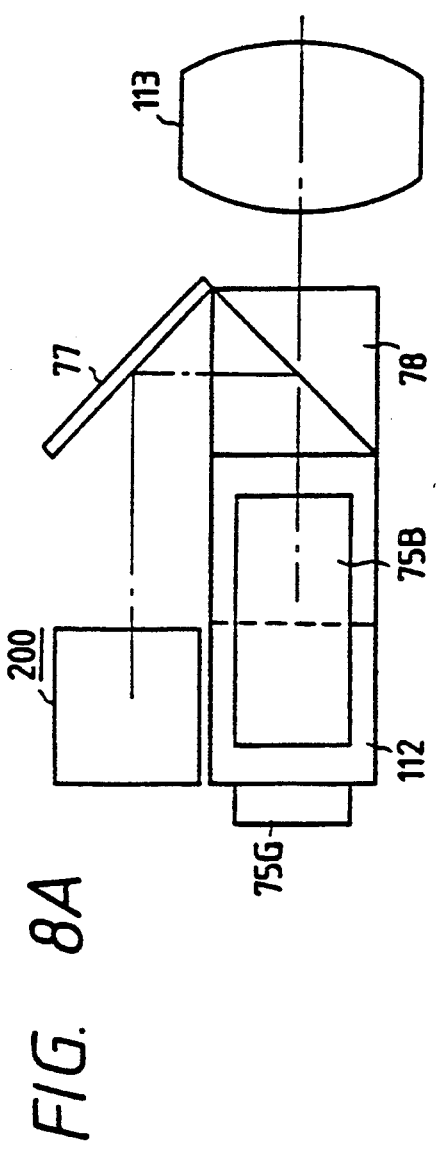
Figure 8B:
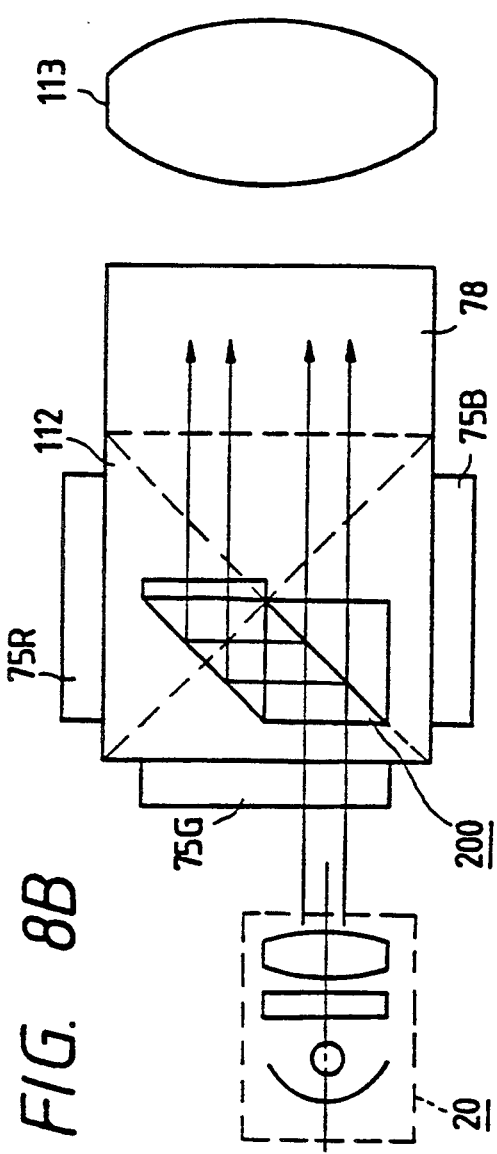

FIGS. 8A and 8B are views showing essential parts of an example of the projection type display unit having the polarized light illuminating system as shown in FIG. 5.

This projection type display unit comprises a light source unit 20 consisting of a light source, a reflection mirror, a heat ray cut filter and a condenser lens (see FIG. 1), a polarization converting device 200, a mirror 77 for reflecting the light emerging from the polarization converting device 200 downward vertically as shown in FIG. 8A, a polarizing beam splitter 78 for reflecting the S polarized light component of the light reflected from the mirror 77 toward the polarization converting device 200 so as to be bent at right angle, and transmitting the P polarized light component of the light, a cross-dye-chroic prism 112 having one side bonded on an emergent surface of the S polarized light component from the polarizing beam splitter 78, and other three sides having reflection type liquid crystal light bulbs 75R, 75G, 75B for red, green and blue bonded thereon, and a projection lens system 113 provided on the other side of the polarizing beam splitter 78 opposite the cross-dye-chroic prism 112.

The parallel white light emitted from the light source unit 20 enters the polarization converting device 200, in which as shown in FIG. 5, the P polarized light component of the parallel white light and the P polarized light component converted by the λ/2 optical phase plate 33 are emitted from the polarization converting device 200 to the mirror 77 (thereafter the P polarized light component and the converted P polarized light are commonly referred to as the P polarized light). The P polarized light is reflected at the mirror 77 to enter the polarizing beam splitter 78. Owing to an action plane of the polarizing beam splitter 78, the polarized plane of the P polarized light is made the S polarized plane, so that the P polarized light is reflected at the action plane, and enters the cross-dye-chroic prism 112. The P polarized light entering the cross-dye-chroic prism 112 is separated into lights for each color of red, green and blue, which enter the reflection type liquid crystal light bulbs 75R, 75G and 75B, respectively. A liquid crystal for use with the reflection type liquid crystal light bulbs 75R, 75G and 75B is ECB (Electrically Controlled Birefringence) type or 45° TN type, having a property of rotating the polarized direction of incident light by the voltage applied in accordance with an image signal. Accordingly, the light incident upon each of the reflection type liquid crystal light bulbs 75R, 75G and 75B is the P polarized light, but the reflected light from each light bulb becomes the light containing the S polarized light in accordance with a signal applied to each pixel of the image signal. Each reflected light is built up by the cross-dye-chroic prism 112, and then is returned to the polarizing beam splitter 78. In this case, the polarizing beam splitter 78 functions as an analyser, so that only the P polarized light component of the reflected light passing through the polarizing beam splitter 78 is projected via a projection lens system 113 on to a screen, not shown, and a color image is formed on the screen.

As above described, the projection type display unit of the present example allows the polarization converting device 200 to convert the parallel white light emitted from the light source unit 20 into the linear polarized light, almost without loss, so that the effect of improving the utilization efficiency of light can be obtained, and as the light flux of each color is separated and built up using the cross-dye-chroic prism 112, the back focus for the projection type lens system 113 can be significantly reduced as compared with this type of conventional projection type display unit, so that the effects of extending the degree of freedom in designing the projection type lens system 113 and making the projection type display unit more compact can be obtained.

While in this example, the polarized light illuminating system is one as shown in FIG. 5, it will be understood that the polarized light illuminating system as shown in FIG. 7 can be similarly used.

With a combination of the polarized light illuminating system of the present invention as shown in FIGS. 5 and 7, and the wedge lenses 14, 15 as shown in FIG. 3, the projection type display unit using the transmission type liquid crystal light bulb 7 as shown in FIG. 3 can be also constituted. Moreover, in the projection type display unit, the polarization converting device according to the present invention can be inserted between the condenser lens 4 and the polarizing plate 5, and between the condenser lens 4 and the polarizing beam splitter 6.

In the polarization converting device 200 as shown in FIGS. 5 and 7, a transparent film of single layer or an air layer can be provided, rather than the optical multi-layer films 36, 56. The refractive index of air layer is 1, necessarily smaller than that of the prism of polarizing beam splitter or the total reflection prism. Accordingly, the same effects as those in the above examples can be expected. Also, when a transparent film of single layer is used, the film is formed of a material indicating a smaller refractive index than that of the prism of polarizing beam splitter, like the conditions imposed on the multi-layer films 36, 56.

Also, in the polarization converting device 200 as shown in FIGS. 5 and 7, the λ/2 optical phase plates 33, 53 are used, but for the plates 33, 53, a well known birefringent crystal, a birefringent type liquid crystal element, and a 90° TN liquid crystal element can be used. When there is no limitation on the size of device, the polarizing plane of the light can be rotated 90° by reflecting the light many times with a mirror assembly instead of the plates 33, 53.

Figure 10:
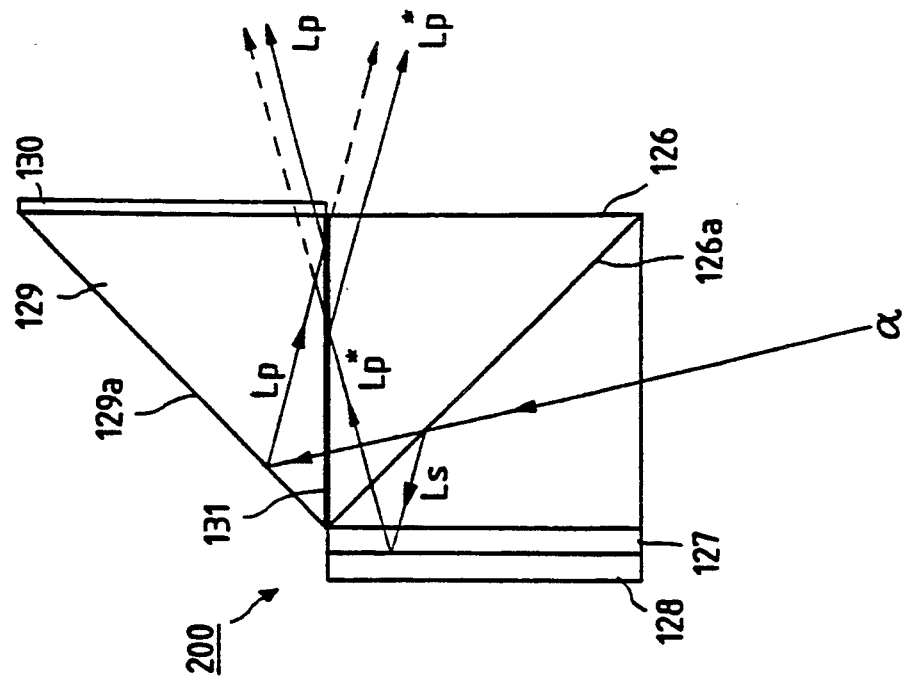
FIG. 10 is a view for explaining the optical path on the polarized light illuminating system as shown in FIG. 9.
Figure 9:
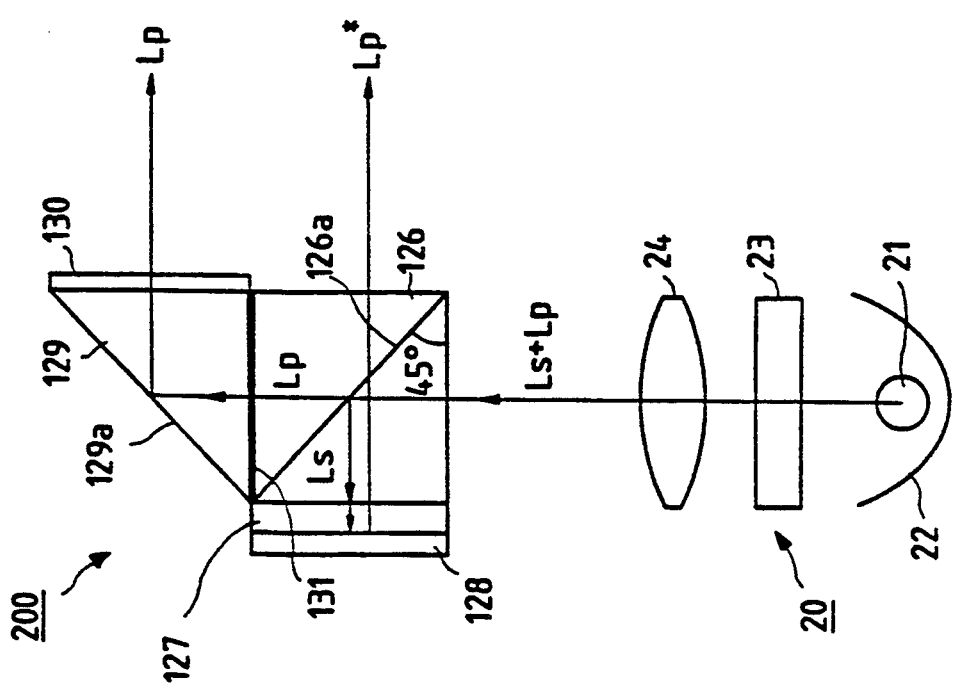
FIG. 9 is a constitutional view showing a third example of a polarized light illuminating system according to the present invention.

FIG. 9 is a constitutional view showing a third example of a polarized light illuminating system according to the present invention, and FIG. 10 is an explanation view for the optical path on the polarized light illuminating system as shown in FIG. 9.

The light incident upon the polarization converting device 200 is emitted from a light source unit 20 comprising a light source 21 consisting of a tungsten halogen lamp or metal halide lamp, a reflection mirror 22 for reflecting a part of light emitted from the light source 21, a heat ray cut filter 23 for absorbing or reflecting the heat ray of light incident thereupon directly or via the reflection mirror 22 from the light source 21, and a condenser lens 24 for transforming the light after removal of said heat ray to parallel light Ls+Lp.

This polarization converting device 200 comprises a polarizing beam splitter 126, a boundary layer film 131, a total reflection prism 129, an extinction filter 130, λ/4 optical phase plate 127, and a reflection plate 128.

The polarizing beam splitter 126 comprises an action slant plane 126a having its one end in contact with one end of an incident surface at a angle of 45° (a deposition film formed on a slant plane on which two rectangular prisms are bonded with each other) and an emergent surface having its one end in contact with the other end of the incident surface at an angle of 90°. Here, the action slant plane 126a transmits the P polarized light component Lp of parallel light Ls+Lp which is an incident light normal to the incident surface, and reflects the S polarized light component Ls at right angle.

The refractive index $n_0$ of the boundary layer film 131 is smaller than the refractive index $n_1$ of the material for the polarizing beam splitter 126, in which assuming the angle of divergence of the parallel light Ls+Lp with the polarizing beam splitter 126 (an angle with respect to the optical axis) to be $\omega$, $0 < n_0/n_1 \leq \omega$ is satisfied, with a characteristic of transmitting the light with smaller incident angle and reflecting the light with larger incident angle. Also, the boundary layer film 131 has its one end in contact with the other end of the action slant plane 126a of the polarizing beam splitter 126 at an angle of 45°, and its other end in contact with the other end of an emergent surface of the polarizing beam splitter 26 at an angle of 90°.

The total reflection prism 129 has a total reflection plane 129a having its one end in contact with the other end of the action slant plane 126a of the polarizing beam splitter 126 at an angle of 90°, for reflecting the P polarized light component Lp transmitted through the action slant plane 126a at right angle to emit it from the emergent surface. Here, the emergent surface has its one end in contact with the other end of the total reflection plane 129a at an angle of 45°, and its other end in contact with the other end of the boundary layer film 131 at an angle of 90°.

The extinction filter 130 is bonded onto the emergent surface of the total reflection plane 129, and serves to decrease the quantity of light for the P polarized light component Lp emerging from the emergent surface by a predetermined amount to emit it therefrom.

The λ/4 optical phase plate 127 has its one end in contact with the other end of the action slant plane 126a of the polarizing beam splitter 126 at an angle of 45°, and its other end in contact with one end of the incident surface of the polarizing beam splitter 126 at an angle of 90°, upon which the S polarized light component Ls reflected from the action slant plane 126a is incident.

The reflecting plate 28 that is an reflecting member has a reflecting surface consisting of an aluminum deposition film or optical multi-layer film bonded on the other side of the λ/4 optical phase plate 127 opposite the polarizing beam splitter 126, and reflects the S polarized light component Ls transmitted through the λ/4 optical phase plate 127.

In this polarized light illuminating system, the parallel light Ls+Lp emerging from the condenser lens 24 is divided into the P polarized light component Lp and the S polarized light component Ls in such a way as to transmit the P polarized light component Lp passing through the action slant plane 126a of the polarizing beam splitter 126 and reflect the S polarized light component Ls at the action slant plane 126a at right angle. The reflected S polarized light component Ls enters the λ/4 optical phase plate 127 at right angle, reflected at a reflecting plane of the reflecting plate 128, and transmitted again through the λ/4 optical phase plate 127, whereby it is converted into the P polarized light component Lp* with its polarized direction being rotated 90°. The converted P polarized light component Lp* is transmitted directly through the action slant plane 126a, and emitted from one emergent surface of the polarizing beam splitter 126. On the other hand, the converted P polarized light component Lp is transmitted via the other emergent surface of the polarizing beam splitter through the boundary layer film 31, then enters the incident surface of the total reflection prism 29, is reflected at the total reflection slant plane 129a of the total reflection prism 129 at right angle, and emerges from the emergent surface of the prism 129, in which it is extinguished by a predetermined amount with the extinction filter 130, and emanated in parallel to the converted P polarized light component Lp*.

Next, the actions of the boundary layer film 131 and the extinction filter 130 will be described with reference to FIG. 10.

When the light source 21 as shown in FIG. 9 is a complete point light source, the parallel light Ls+Lp emerging from the condenser lens 24 is incident upon the incident surface of the polarizing beam splitter 126 at a right angle, and then is divided into the P polarized light component Lp and the S polarized light component Ls at the action slant plane 126a of the polarizing beam splitter 126, as previously described, in which the P polarized light component Lp and the P polarized light component Lp* converted from the S polarized light component Ls are emitted in parallel from the total reflection prism 129 side and the polarizing beam splitter 126 side, respectively. However, when the light source 21 is not a complete point light source, the light emerging from the condenser lens 24 is not made a complete parallel light but a light containing an angle of divergence $\omega$, whereby there is also the light incident obliquely upon the incident surface of the polarizing beam splitter 126, as indicated by the light ray $\alpha$ in FIG. 10. The light as indicated by the light ray $\alpha$ is similarly separated into the P polarized light component Lp and the S polarized light component Ls at the action slant plane 126a of the polarizing beam splitter 126. But the P polarized light component Lp transmitted through the action slant plane 126a passes via the other emergent surface of the polarizing beam splitter 126 through the boundary layer film 131, and then enters the incident surface of the total reflection prism 129, and is reflected at the total reflection slant plane 129a of the total reflection prism 129. At this time, the light ray $\alpha$ is reflected to the boundary layer film 131. As a result, when there is no boundary layer film 131, it exits from one emergent surface of the polarizing beam splitter 126, as indicated by a dot line in the figure, while if the boundary layer film 131 is provided, the boundary layer film 131 reflects the light with larger incident angle, whereby the P polarized light component Lp reflected from the total reflection slant plane 129a is also reflected at the boundary layer film 131 to enter the emergent surface of the total reflection prism 129 and exit via the extinction filter 130. On the other hand, the S polarized light component Ls reflected from the action slant plane 126a is also converted into the P polarized light component Lp* by the λ/4 optical phase plate 127 and the reflecting plate 128, but is reflected to the boundary layer film 131 when being reflected at the reflecting plate 128. As a result, if the boundary layer film 131 is not provided, it exits from the total reflection prism side 129 side, as indicated by a dot line in the figure, but if the boundary layer film 131 is provided, the converted P polarized light component Lp* is also reflected at the boundary layer film 131 and exits from one emergent surface of the polarizing beam splitter 126.

Accordingly, this polarized light illuminating system can emit the P polarized light component Lp transmitted through the action slant plane 126a of the polarizing beam splitter 126 and the S polarized light component Ls reflected at the action slant plane 126a, which are almost completely divided with a provision of the boundary layer film 131, even when incomplete point light source is used, thereby eliminating the cross-talk between the P polarized light component Lp* converted from the S polarized light component Ls and the P polarized light component Lp, and reducing wasteful loss of light emerging therefrom.

Also, the S polarized light component Ls reflected from the action slant plane 126a of the polarizing beam splitter 126 is extinguished with the λ/4 optical phase plate 127 and the reflecting plate 128, but the P. polarized light component Lp reflected from the total reflection slant plane 129a of the total reflection prism 129 is extinguished by the same amount with the extinction filter 130 to be emitted therefrom, thereby preventing unevenness of intensity between the lights Lp and Lp*.

As above described, this polarized light illuminating system can utilize both the P polarized light component Lp and the S polarized light component Ls which are divided by the polarizing beam splitter 126, for illuminating the light bulb, not shown, so that the utilization efficiency of light can be improved. Also, by illuminating the light bulb in parallel with the lights Lp and Lp*, it is possible to shorten the distance between the polarized light illuminating system and the light bulb, which was difficult to resolve with a method of illuminating the light bulb with the synthetic light as shown in FIG. 3, and further to make smaller the projection type display unit having the polarized light illuminating system of the present invention.

Figure 11:
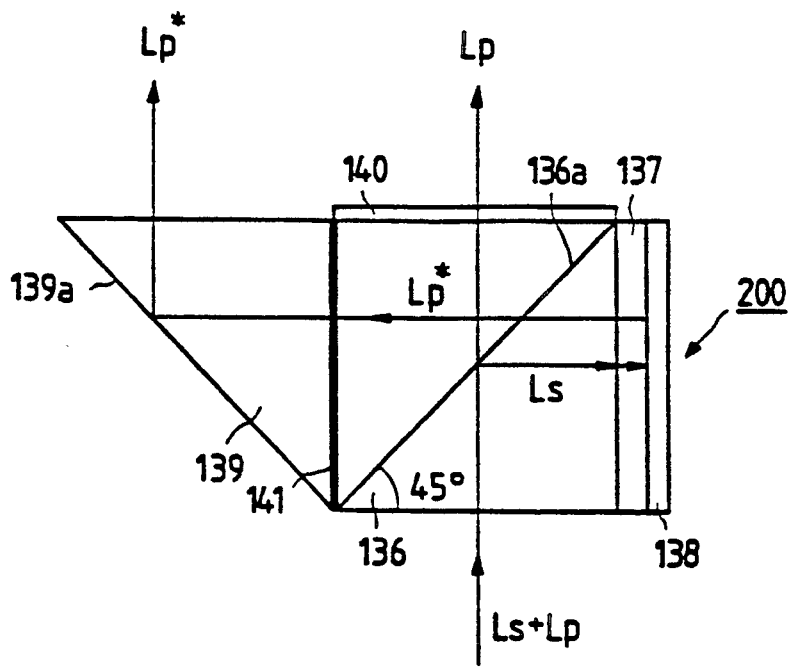
FIG. 11 is a constitutional view showing a fourth example of a polarized light illuminating system according to the present invention.

FIG. 11 is a constitutional view showing a fourth example of a polarized light illuminating system according to the present invention.

This polarized light illuminating system is the same as shown in FIG. 10 in that the device 200 comprises a polarizing beam splitter 136, a boundary layer film 141, a total reflection prism 139, an extinction filter 140, a λ/4 optical phase plate 137, and a reflection plate 138, but differs from the device of FIG. 10 in that the device 200 emits the emergent light in the same direction as for the incident light having an angle of divergence ω.

The polarizing beam splitter 136 comprises an action slant plane 136a (a deposition film formed on a slant plane on which two rectangular prisms are bonded with each other) having its one end in contact with one end of an incident surface at an angle of 45°. The action slant plane 136a transmits the P polarized light component Lp of parallel light Ls+Lp which is an incident light normal to the incident surface, and in addition, reflects the S polarized light component Ls at right angle. Also, the polarizing beam splitter 136 comprises an emergent surface for emitting the P polarized light component lp transmitted through the action slant plane 136a.

The λ/4 optical phase plate 137 has its one end in contact with the other end of the incident surface 136 of the polarizing beam splitter 136 at an angle of 90°, and its other end in contact with the other end of the action slant plane 136a of the polarizing beam splitter 136 at an angle of 45°, upon which the S polarized light component Ls reflected from the action slant plane 136a is incident at right angle.

The reflecting plate 138 that is an reflecting member has a reflecting surface consisting of an aluminum deposition film or optical multi-layer film bonded on the other side of the λ/4 optical phase plate 137 opposite the polarizing beam splitter 136, for reflecting the S polarized light component Ls transmitted through the λ/4 optical phase plate 137.

The extinction filter 140 is bonded on an emergent surface of the polarizing beam splitter 136, for extinguishing the quantity of light for the P polarized light component Lp emerging from the emergent surface by a predetermined amount to emit it therefrom.

The boundary layer film 141 (refractive index $n_0$) is made of a material having a smaller refractive index than that of a material for the polarizing beam splitter 136 (refractive index $n_1$), such that $0 < n_0/n_1 \leq \omega$, like the previous example, and having a characteristic of transmitting the light with smaller incident angle and reflecting the light with larger incident angle. Also, the boundary layer film 141 has its one end in contact with one end of the action slant plane 136a of the polarizing beam splitter 136 at an angle of 45°, and its other end in contact with one end of the emergent surface of the polarizing beam splitter 26 at an angle of 90°.

The total reflection prism 139 has a total reflection slant plane 139a and an emergent surface. The total reflection slant plane 139 has its one end in contact with one end of the action slant plane 136a of the polarizing beam splitter 136 at an angle of 90°, and reflects the P polarized light component Lp* (which is converted from the S polarized light component Ls reflected from the action slant plane 136a by rotating its polarized direction 90° with the λ/4 optical phase plate 137 and the reflecting plate 138) at right angle to emit it from the emergent surface. The emergent surface has its one end in contact with the other end of the total reflection slant plane 139a at an angle of 45°, and its other end in contact with the other end of the boundary layer film 141 at an angle of 90°, in which the converted P polarized light component Lp* is emanated from the emergent surface in parallel to the P polarized light component Lp emerging from the extinction filter 140.

Also, in the polarized light illuminating system of this example, since the incident parallel light Ls+Lp is not a complete parallel light but a light having an angle of divergence ω, the P polarized light component Lp of the parallel light Ls+Lp is transmitted through the action slant plane 136a of the polarizing beam splitter 136, even at a larger angle of incidence with respect to the boundary layer film 141, then reflected at the boundary layer film 141, travels toward the emergent surface of the polarizing beam splitter 136, and exits through the extinction filter 140, so that the same effects as those for the polarized light illuminating system as shown in FIG. 9 can be obtained.

Figure 12:
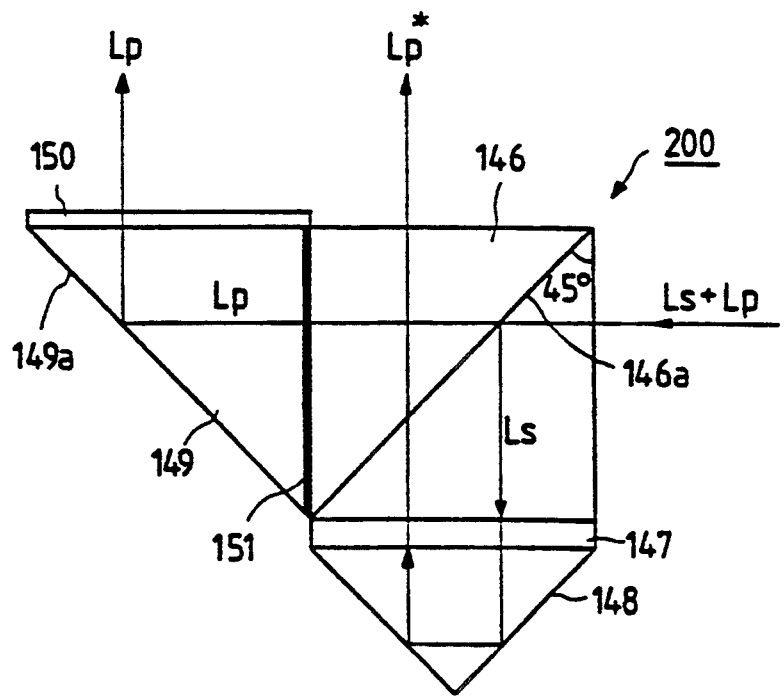
FIG. 12 is a constitutional view showing a fifth example of a polarized light illuminating system according to the present invention.

FIG. 12 is a constitutional view showing a fifth example of a polarized light illuminating system according to the present invention.

This polarized light illuminating system makes use of a rectangular prism 148, in place of the reflecting plate of the polarized light illuminating system as shown in FIG. 9, to reflect the S polarized light component Ls reflected from the action slant plane 146a of the polarizing beam splitter 146 without producing unwanted polarized light component.

This polarized light illuminating system is constructed in the same conditions as the device of FIG. 9 by providing a boundary layer film 151 at a boundary surface between the polarizing beam splitter and the total reflection prism 149, and by bonding an extinction filter 150 on an emergent surface of the total reflection prism 149, so that the same effects as those of the polarized light illuminating system as shown in FIG. 9 can be obtained.

While in the polarized light illuminating system of the (third to fifth) examples as described, a transparent boundary layer film is provided on the boundary surface between the polarizing beam splitter and the total reflection prism, the polarized light illuminating system of each example can operate in the same manner by providing an optical multi-layer film having a characteristic of transmitting the light with smaller incident angle and reflecting the light with larger incident angle and including at least one layer having a smaller refractive index than that of a material for the prism of polarizing beam splitter, respectively, as shown in first and second examples, so that the same effects can be obtained. For example, an adhesive having a smaller refractive index than a material of the polarizing beam splitter for bonding the polarizing beam splitter and the total reflection prism, or an air layer can be satisfied. Note that such an adhesive of low refractive index can be also used in the first and second examples.

Next, another example of the projection type display unit will be described in which the polarized light illuminating system of the present invention is combined with other optical devices.

Figure 13A:
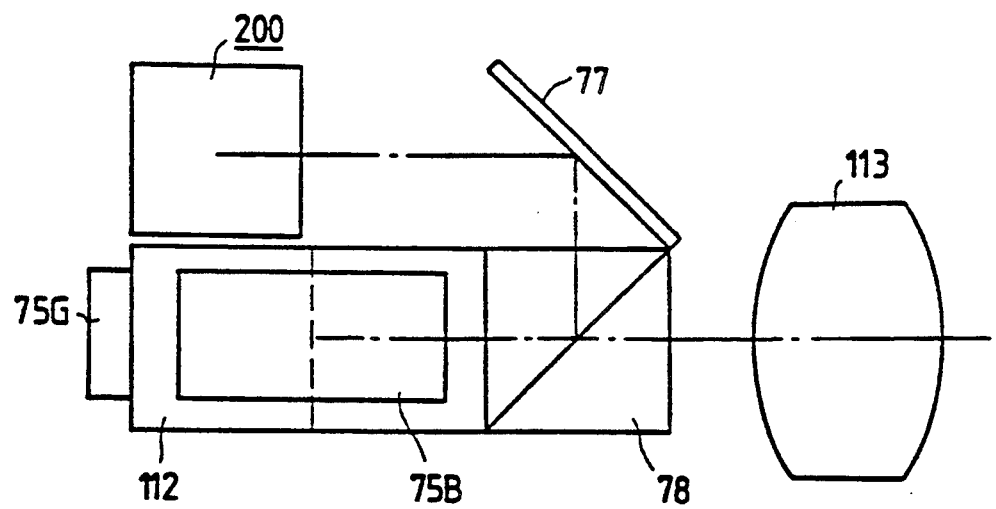
Figure 13B:
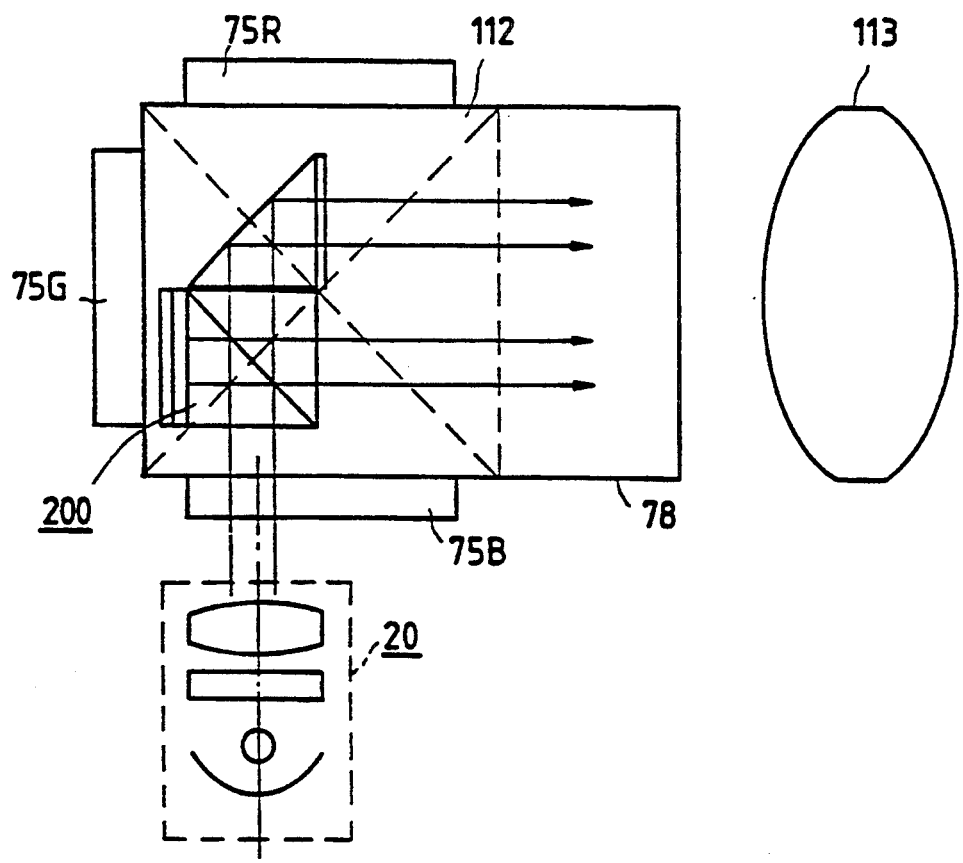

FIGS. 13A and 13B are views showing essential parts of an example of the projection type display unit having the polarized light illuminating system as shown in FIG. 9.

This projection type display unit comprises a light source unit 20 consisting of a light source, a reflection mirror, a heat ray cut filter and a condenser lens (see FIG. 1), a polarization converting device 200, a mirror 77 for reflecting the light emerging from the polarization converting device 200 downward vertically as shown in FIG. 13A, a polarizing beam splitter 78 for reflecting the S polarized light component of the light reflected from the mirror 77 toward the polarization converting device 200, at right angle, and transmitting the P polarized light component of the light, a cross-dye-chroic prism 112 having one side bonded on an emergent surface of the S polarized light component of the polarizing beam splitter 78, and other three sides having reflection type liquid crystal light bulbs 75R, 75G, 75B for red, green and blue bonded thereon, and a projection lens system 113 provided on the other side of the polarizing beam splitter 78 opposite the cross-dye-chroic prism 112.

The parallel white light emitted from the light source unit 20 enters the polarization converting device 200, in which as shown in FIG. 9, the P polarized light component Lp of the parallel white light and the P polarized light component Lp* converted from the S polarized light component Ls by a λ/2 optical phase plate 27 and a reflecting plate 28 are emitted from the polarization converting device 200 to the mirror 77 (thereafter the P polarized light component and the converted P polarized light are commonly referred to as the P polarized light). The P polarized light is reflected against the mirror 77 to enter the polarizing beam splitter 78. Owing to the action plane of the polarizing beam splitter 78, the polarized plane of the P polarized light is made the S polarized plane, so that the P polarized light is reflected at the action plane, and enters the cross-dye-chroic prism 112. The P polarized light entering the cross-dye-chroic prism 112 is separated into the lights for each color of red, green and blue, which then enter the reflection type liquid crystal light bulbs 75R, 75G and 75B, respectively. A liquid crystal for use with the reflection type liquid crystal light bulbs 75R, 75G and 75B is ECB (Electrically Controlled Birefringence) type or 45° TN type, having a property of rotating the polarized direction of incident light by the voltage applied in accordance with an image signal. Accordingly, the light incident upon each of the reflection type liquid crystal light bulbs 75R, 75G and 75B is the P polarized light, but the reflected light from each light bulb becomes the light containing the S polarized light component in accordance with a signal applied to each pixel of the image signal. Each reflected light is built up by the cross-dye-chroic prism 112, and then is returned to the polarizing beam splitter 78. In this case, the polarizing beam splitter 78 can function as an analyser, only the P polarized light component of the reflected light passing through the polarizing beam splitter 78 is projected via the projection lens system 113 on to a screen, not shown, and a color image is formed on the screen.

As above described, the projection type display unit of the present example allows the polarization converting device 200 to convert the parallel white light emitted from the light source unit 20 into the linear polarized light, almost without loss, so that the effect of improving the utilization efficiency of light can be obtained. Also, since the light flux of each color is separated and built up using the cross-dye-chroic prism 112, the back focus for the projection lens system 113 can be significantly reduced as compared with this type of a conventional projection type display unit, so that the effect of extending the degree of freedom in designing the projection type lens system 113 and making the projection type display unit more compact can be obtained.

While in this example, the polarized light illuminating system is one as shown in FIG. 9, it is note that the polarized light illuminating system as shown in FIG. 11 or 12 can be similarly used.

Figure 1:
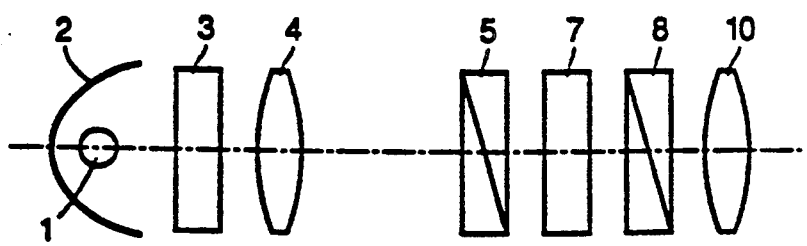
FIG. 1 is a constitutional view showing a conventional example of a projection type display unit.
Figure 2:
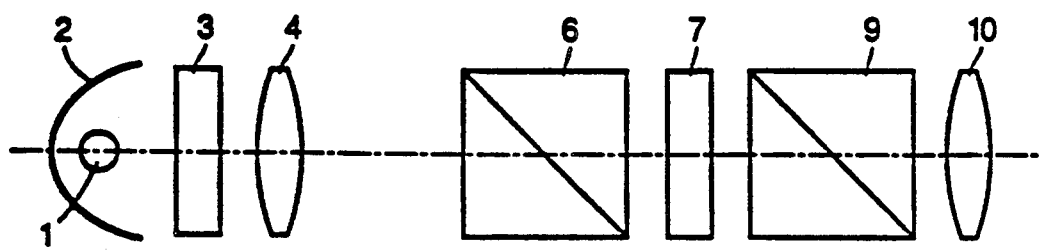
FIG. 2 is a constitutional view showing another conventional example of a projection type display unit.

With a combination of the polarized light illuminating system of the present invention as shown in FIGS. 9, 11 and 12, and the wedge lenses 14, 15 as shown in FIG. 3, the projection type display unit using the transmission type liquid crystal light bulb 7 as shown in FIG. 3 can be constituted. Moreover, in the projection type display unit as shown in FIGS. 1 and 2, the polarization converting device according to the present invention can be inserted between the condenser lens 4 and the polarizing plate 5, and between the condenser lens 4 and the polarizing beam splitter 6.

A combination of the λ/4 optical phase plate and the mirror used in the polarization converting device 200 as shown in FIGS. 9, 11 and 12 can serve as a λ/2 plate. Accordingly, for the λ/4 optical phase plate, a well known birefringent crystal and a birefringent type liquid crystal element can be used, as described in the previous examples.

The polarization converting device 200 as shown in FIGS. 9, 12 and 13 makes use of extinction filters 130, 150 in order to correct for unbalance of quantity of light between the polarized lights Lp and Lp*, but there is another form to attain the same purpose. This form is one in which a light absorbing material is mixed into the total reflection prisms 129 and 149, in each example as shown in FIGS. 9, 12 and 13, instead of using the extinction filter. By suitably determining the kind and amount of the light absorbing material, the quantity of the polarized light Lp can be extinguished by a predetermined amount within the device 200 so that the quantity of the polarized light Lp emerging from the device 200 is made almost equal to that of the polarized light Lp* also emerging therefrom. As this light absorbing material, a transition element such as Cr or Mn can be used.

Also, in the above examples as shown in FIGS. 5-13, the refractive index of a thin transparent layer (optical single layer film, optical multi-layer film or air layer) provided on the boundary between an emergent surface of the polarizing beam splitter and an incident surface of the total reflection prism is preferably smaller than that of a material of the total reflection prism, but may be almost coincident with the refractive index of the material of the total refractive index.

As a material for the optical single layer or multi-layer film of this transparent layer, $MgF_2$ (magnesium fluoride) having a comparatively small refractive index can be used.

Figure 15:
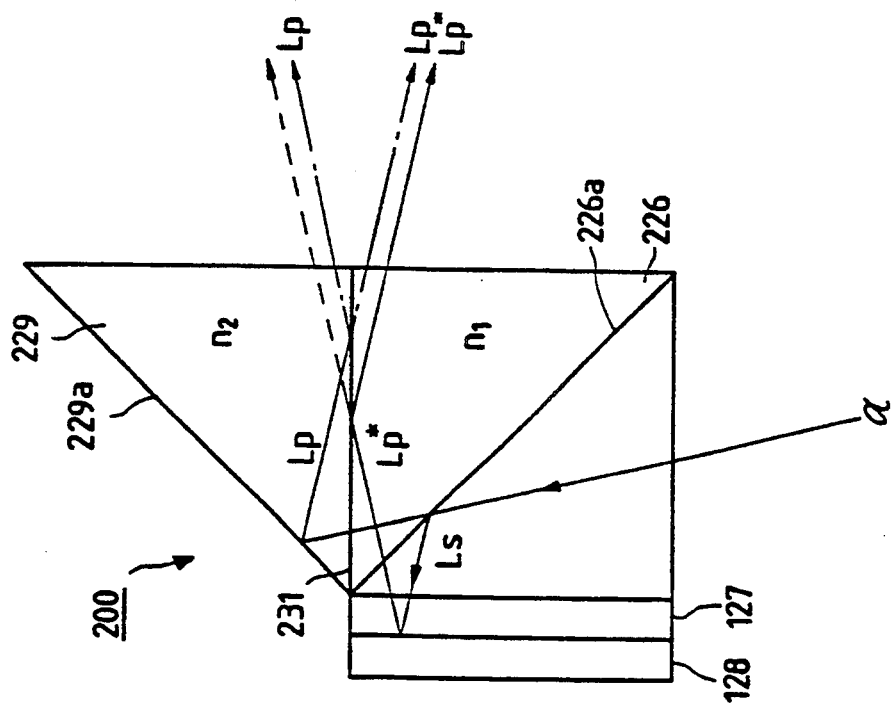
FIG. 15 is a view for explaining the optical path on the polarized light illuminating system as shown in FIG. 14.
Figure 14:
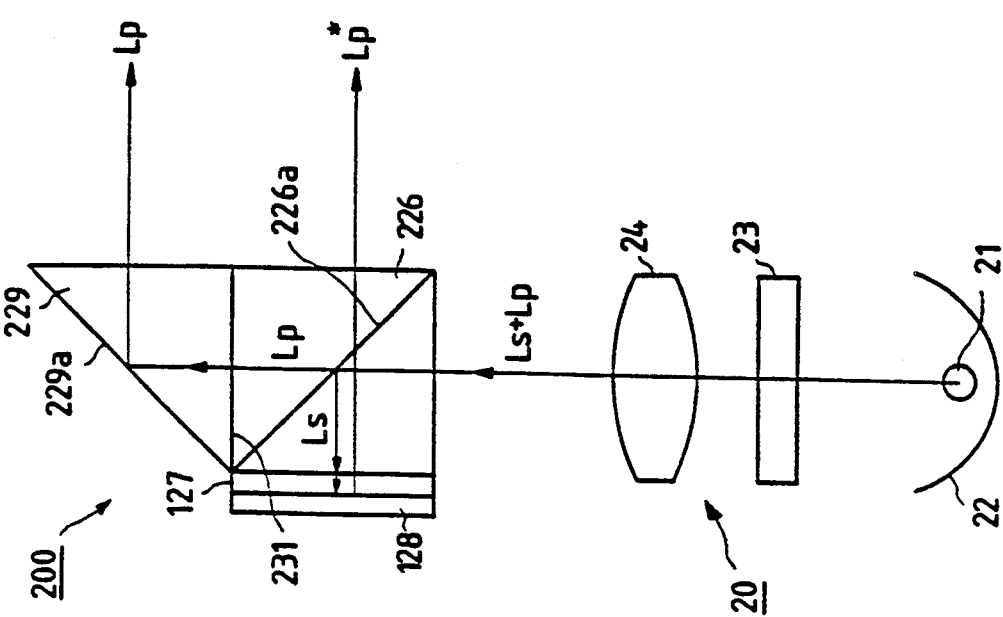
FIG. 14 is a constitutional view showing a sixth example of a polarized light illuminating system according to the present invention.

FIG. 14 is a constitutional view showing a sixth example of a polarized light illuminating system according to the present invention, and FIG. 15 is an explanation view for the optical path on the polarized light illuminating system as shown in FIG. 14.

The light incident upon the polarization converting device 200 is emitted from a light source unit 20 comprising a light source 21 consisting of a tungsten halogen lamp or metal halide lamp, a reflection mirror 22 for reflecting a part of light emitted from the light source 21, a heat ray cut filter 23 for absorbing or reflecting the heat ray of light incident thereupon directly or Via the reflection mirror 22 from the light source 21, and a condenser lens 24 for transforming the light after removal of the heat ray to parallel light Ls+Lp.

This polarization converting device 200 comprises a polarizing beam splitter 226, a total reflection prism 229 made of a material having a lower refractive index than that of the polarizing beam splitter, a λ/4 optical phase plate 127, and a reflection plate 128.

The polarizing beam splitter 226 comprises an action slant plane 226a having its one end in contact with one end of an incident surface at an angle of 45° (a deposition film formed on a slant plane on which two rectangular prisms are bonded with each other) and an emergent surface having its one end in contact with one end of the incident surface at an angle of 90°. Here, the action slant plane 226a as previously described transmits the P polarized light component Lp of parallel light Ls+Lp which is an incident light normal to the incident surface, and in addition, reflects the S polarized light component Ls at right angle.

The total reflection prism 229 is made of a material having a smaller refractive index than that of a material for the polarizing beam splitter 226, and having a characteristic of transmitting the light with smaller incident angle and reflecting the light with larger incident angle at the incident surface in contact with the polarizing beam splitter 226.

Also, the total reflection prism 229 has a total reflection slant plane 229a having its one end in contact with the other end of the action slant plane 226a of the polarizing beam splitter 226 at an angle of 90°, and reflects the P polarized light component Lp transmitted through the action slant plane 226a at right angle to emit it from the emergent surface. Here, the emergent surface has its one end incontact with the other end of the total reflection plane 129a at an angle of 45°, and its other end in contact with the other end of the emergent surface of the polarizing beam splitter 226 at an angle of 0°.

The λ/4 optical phase plate 127 has its one end in contact with the other end of the action slant plane 226a of the polarizing beam splitter 126 at an angle of 45°, and its other end in contact with the other end of the incident surface of the polarizing beam splitter 126 at an angle of 90° upon which the S polarized light component Ls reflected from the action slant plane 226a is incident at right angle.

The reflecting plate 128 that is an reflecting member has a reflecting surface consisting of an aluminum deposition film or optical multi-layer film bonded on the other side of the λ/4 optical phase plate 127 opposite the polarizing beam splitter 226, and reflects the S polarized light component Ls transmitted through the λ/4 optical phase plate 127.

In this polarized light illuminating system, the parallel light Ls+Lp emerging from the condenser lens 24 is divided into the P polarized light component Lp and the S polarized light component Ls in such a way as to transmit the P polarized light component Lp through the action slant plane 226a of the polarizing beam splitter 226 and reflect the S polarized light component Ls at the action slant plane 226a at right angle. The reflected S polarized light component Ls enters the λ/4 optical phase plate 127 at right angle and is reflected from a reflecting plane of the reflecting plate 128 to pass again through the λ/4 optical phase plate 127, and it is thereby converted into the P polarized light component Lp* with its polarized direction being rotated 90°. The converted P polarized light component Lp* is transmitted directly through the action slant plane 126a, and exits from the emergent surface of the polarizing beam splitter 226. On the other hand, the converted P polarized light component Lp is transmitted through the incident surface 231 of the total reflection prism 229, reflected at the total reflection slant plane 229a of the total reflection prism 229 at right angle, and emerges from the emergent surface of the total reflection prism 229 in parallel to the converted P polarized light component Lp*.

Next, the action of the total reflection prism 229 having a lower refractive index than that for the prism of the polarizing beam splitter 226 will be described with reference to FIG. 2.

When the light source 21 as shown in FIG. 14 is a complete point light source, the parallel light Ls+Lp emerging from the condenser lens 24 is incident upon the incident surface of the polarizing beam splitter 226 at right angle, divided into the P polarized light component Lp and the S polarized light component Ls at the action slant plane 226a of the polarizing beam splitter 226, as previously described, in which the P polarized light component Lp and the P polarized light component Lp* converted from the S polarized light component Ls are emitted in parallel from the total reflection prism 229 side and the polarizing beam splitter 226 side, respectively. However, when the light source 21 is not a complete point light source, the light emerging from the condenser lens 24 is not rendered a complete parallel light, but a light having an angle of divergence ω, so that there is also the light incident obliquely upon the incident surface of the polarizing beam splitter 226 at an incident angle $\theta$ ($\theta \leq \omega$), as indicated by a light ray $\alpha$ in FIG. 15. The light as indicated by the light ray $\alpha$ is similarly separated into the P polarized light component Lp and the S polarized light component Ls at the action slant plane 226a of the polarizing beam splitter 226.

However, the S polarized light component Ls of the light ray $\alpha$ reflected from the action slant plane 226a is transmitted through the $\lambda/4$ optical phase plate 127, reflected at a reflecting plate 128, again transmitted through the $\lambda/4$ optical phase plate 127, converted into the P polarized light component Lp*, and travels toward the incident surface 231 of the total reflection prism 229. At this time, the incident angle of the P polarized light component Lp* of the light ray $\alpha$ upon the incident surface 231 is $\pi/2 - \omega$. Assuming that the refractive index of the polarizing beam splitter 226 is $n_1$, that of the total reflection prism is $n_2$, and the emergent angle of the P polarized light component Lp* from the incident surface 231 is $\omega'$ the following expression will stand owing to a Snell's law.

$$n_1 \sin (\pi/2 - \omega) = n_2 \sin \omega'$$

That is, $n_1/n_2 \cos\omega = \sin \omega'$. Since the condition that the P polarized light component Lp* of the light ray $\alpha$ is totally reflected at the incident surface 231 is $\sin \omega' \geq 1$, the above expression is written as below.

$$n_1/n_2 \cos \omega \geq 1$$

That is, $0 < n_2/n_1 \cos \omega (n_1, n_2 > 0)$

In this example, as the refractive index $n_1$ of a substrate glass for the polarizing beam splitter 226 is 1.68 (SF8), the refractive index $n_2$ of the total reflection prism 229 is 1.52 (BK7), and the angle of divergence $\omega$ of the incident light flux Ls+Lp with the polarizing beam splitter 226 is about 7°, $$n_1/n_2 \cos \omega = 1.097 > 1$$

so that the P polarized light component Lp* of the light ray $\alpha$ is totally reflected at the incident surface 31 of the total reflection prism and emitted from the emergent surface of the polarizing beam splitter 26, as indicated by the solid line.

Figure 4:
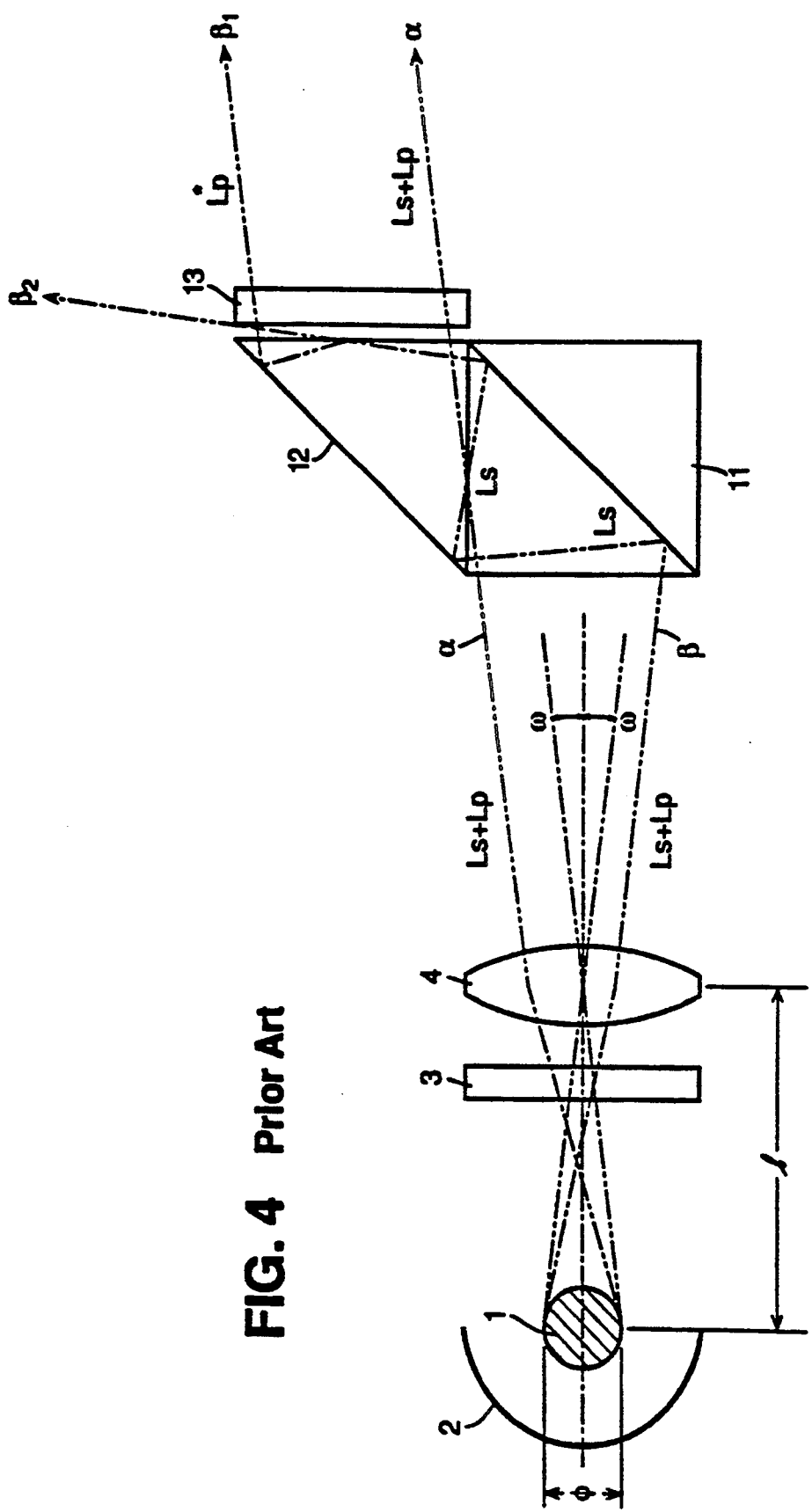
FIG. 4 is a view for explaining some problems as to the projection type display unit as shown in FIG. 3.

The P polarized light component Lp of the light ray $\alpha$ transmitted through the action plane 226a is passed through an incident surface 231 of the total reflection prism 229, and reflected toward the incident surface 231 of the total reflection prism 229 when being reflected at the total reflection plane 229a. As a result, if the refractive index $n_2$ of the total reflection prism 229 is equal to the refractive index $n_1$ of a material for the polarizing beam splitter 226, it is directly emitted from the emergent surface of the polarizing beam splitter 26, but as in this example, by making the refractive index $n_2$ of the total reflection prism 229 smaller than the refractive index $n_1$ of the polarizing beam splitter 226, the light having a large angle of incidence upon the incident surface 231 of the total reflection prism 229 has a portion of the P polarized light component Lp Fresnel reflected at the incident surface 231 and emitted from the emergent surface of the total reflection prism 229, as indicated by the dot and dash line, and the remainder transmitted and emitted from the emergent surface of the polarizing beam splitter 226. Accordingly, the emergent light $\beta_1$ as indicated in FIG. 4 can be subtracted.

Accordingly, this polarizing light illuminating system allows the P polarized light component Lp transmitted through the action slant plane 226a of the polarizing beam splitter 226 and the S polarized light component LS reflected from the action slant plane 226a to be almost completely separated, even by means of a light source 21 which is not a complete point light source, with a provision of the total reflection prism having a refractive index $n_2$ satisfying the previous condition $0 < n_1/n_2 \leq \cos \omega$, and emitted from mutually different emergent planes.

Also, with this polarized light illuminating system, it is possible to utilize both the P polarized light component Lp and the S polarized light component LS which are separated by the polarizing beam splitter 226 for illuminating the light bulb, not shown, so that the utilization efficiency of light can be improved. Also, by illuminating in parallel the light bulb with the lights Lp, Lp*, it is possible to shorten the distance between the polarized light illuminating system and the light bulb, which was difficult to resolve with a method of illuminating the light bulb with the synthetic light as shown in FIG. 3, and it is further possible to miniaturize the projection type display unit having the polarized light illuminating system.

Further, in the conventional example as shown in FIG. 3, the relation between the refractive index $n_1$ of a material for the polarizing beam splitter and the refractive index $n_2$ of a material for the total reflection prism which are in contact with each other is also applicable. That is, in FIG. 4, the light ray $\alpha$ is totally reflected at an interface 14 between the total reflection prism 12 and the polarizing beam splitter 11, necessarily traveling toward the action slant plane 11a, so that the transmission of light as shown does not occur. Also, when the light ray $\beta$ travels from the total reflection prism 12 to the polarizing beam splitter, a part of light is Fresnel reflected at the interface 14, and other part will be transmitted, so that the quantity of emergent light $\beta_1$ can be reduced.

Figure 16:
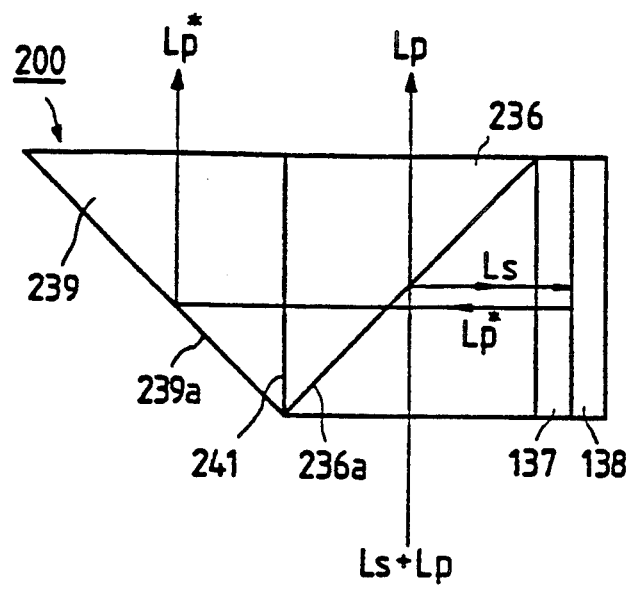
FIG. 16 is a constitutional view showing a seventh example of a polarized light illuminating system according to the present invention.

FIG. 16 is a constitutional view showing essential parts of a seventh example of a polarized light illuminating system according to the present invention.

This polarized light illuminating system comprises, like the polarized light illuminating system as shown in FIG. 14, a polarizing beam splitter 236 consisting of a prism having a refractive index of 1.68, a total reflection prism 239 having a refractive index of 1.52, a $\lambda/4$ optical phase plane 137, and a reflection plate 138, but differs from the device of FIG. 14 in that it emits the emergent light from the device 200 in the same direction as that for the incident light.

That is, the polarizing beam splitter 236 comprises an action slant plane 236a (a deposition film formed on a slant plane on which two rectangular prisms are bonded with each other) having its one end in contact with one end of an incident surface at a angle of 45°. The action slant plane 236a transmits the P polarized light component Lp of parallel light LS+Lp which is an incident light normal to the incident surface, and in addition, reflects the S polarized light component LS at right angle. Also, the polarizing beam splitter 236 comprises an emergent surface from which the P polarized light component Lp transmitted through the action slant plane 236a exits.

The $\lambda/4$ optical phase plate 137 has its one end in contact with the other end of the incident surface 136 of the polarizing beam splitter 236 at an angle of 90°, and its other end in contact with the other end of the action slant plane 236a of the polarizing beam splitter 236 at an angle of 45°, upon which the S polarized light component Ls reflected from the action slant plane 236a is incident at right angle.

The reflecting plate 138 that is an reflecting member has a reflecting surface consisting of an aluminum deposition film or optical multi-layer film bonded on the other side of the λ/4 optical phase plate 137 opposite the polarizing beam splitter 236, and reflects the S polarized light component Ls transmitted through the λ/4 optical phase plate 137.

The total reflection prism 239 is made of a material having a less refractive index than that of a material for the polarizing beam splitter 236 and having a characteristic of transmitting the light with smaller incident angle and reflecting the light with larger incident angle on an incident surface 241 of the total reflection prism 239. That is, the refractive index $n_1$ of the polarizing beam splitter, the refractive index $n_2$ of the total reflection prism 239, and the angle of divergence $\omega$ of the light Ls+Lp in a medium of the polarizing beam splitter 236 will satisfy the relation $0 < n_2/n_1 \leq \cos \omega$.

The total reflection prism 239 has a total reflection slant plane 239a and an emergent surface. The total reflection slant plane 239a has its one end in contact with one end of the action slant plane 236a of the polarizing beam splitter 236 at an angle of 90°, and reflects the P polarized light component Lp* (which is converted from the S polarized light component Ls. reflected from the action slant plane 236a by rotating its polarized direction by 90° with the λ/4 optical phase plate 137 and the reflecting plate 138) transmitted through the action slant plane 236a at right angle to emit it from the emergent surface. The emergent surface has its one end in contact with the other end of the total reflection slant plane 239a at an angle of 45°, and its other end in contact with the other end of the incident surface 241 at an angle of 90° so as to emit the converted P polarized light component Lp* and the P polarized light component Lp in parallel.

Also in the polarized light illuminating system of this example, since the incident parallel light Ls+Lp upon the device 200 is not a complete parallel light, when a certain light ray is incident upon an incident surface 241 of the total reflection prism 239, even at a larger incident angle, the P polarized light component Lp of the parallel light Ls+Lp is transmitted through the action slant plane 236a of the polarizing beam splitter 236, then reflected at the boundary layer film 241 of the total reflection prism 239 and exits therefrom, so that the same effects as those for the polarized light illuminating system as shown in FIG. 14 can be obtained.

Figure 17:
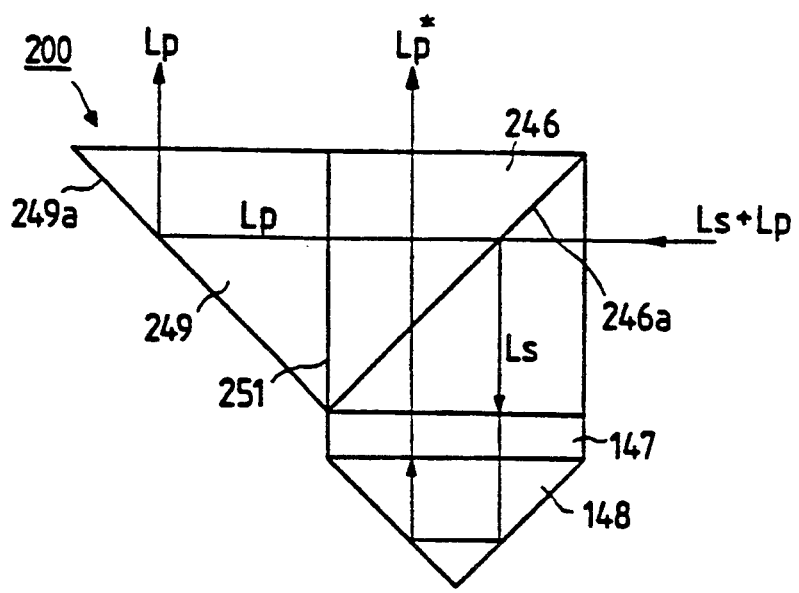
FIG. 17 is a constitutional view showing an eighth example of a polarized light illuminating system according to the present invention.

FIG. 17 is a constitutional view showing an eighth example of a polarized light illuminating system according to the present invention.

This polarized light illuminating system makes use of a rectangular prism 148, in place of the reflecting plate 138 of the polarized light illuminating system as shown in FIG. 14, to reflect the S polarized light component Ls reflected from the action slant plane 246a of the polarizing beam splitter 246, without producing unwanted polarized light component.

With this polarized light illuminating system, the same effects as those of the polarized light illuminating system as shown in FIG. 14 can be obtained by providing the total reflection prism 249 of a material having a less refractive index than that of the polarizing beam splitter.

That is, in this device, the refractive index $n_1$ of the polarizing beam splitter 246, the refractive index $n_2$ of the total reflection prism 249, and the angle of divergence $\omega$ of the light Ls+Lp in a medium of the polarizing beam splitter 246 will satisfy the relation $0 < n_2/n_1 \leq \cos \omega$.

Figure 18:
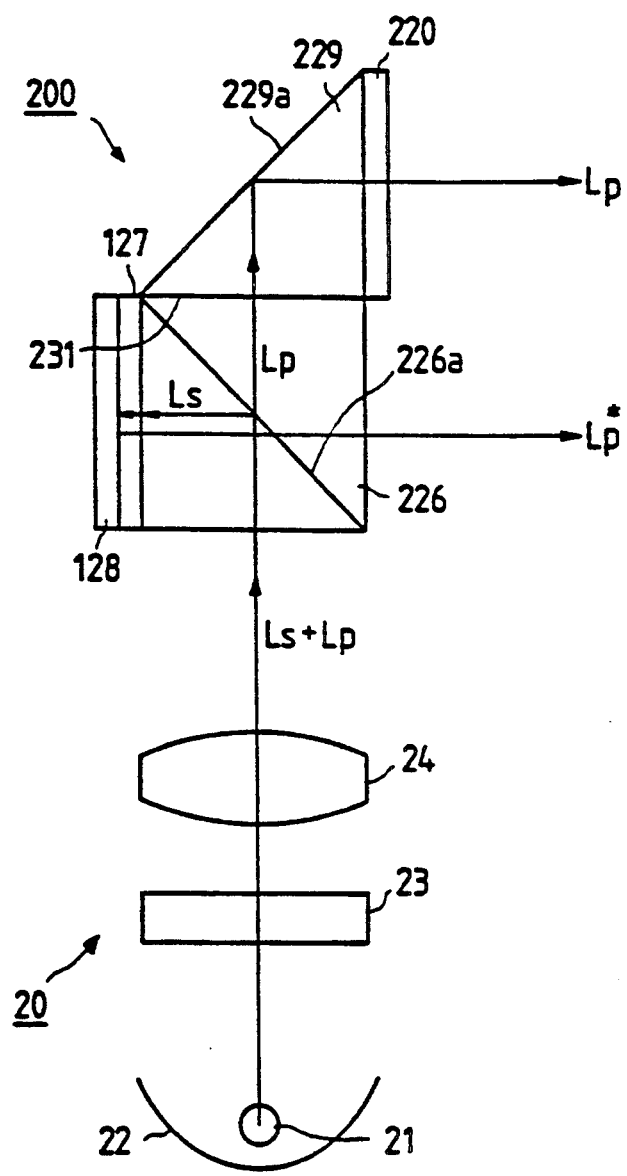
FIG. 18 is a constitutional view showing a ninth example of a polarized light illuminating system according to the present invention.

FIG. 18 is a constitutional view showing a ninth example of a polarized light illuminating system according to the present invention.

This polarized light illuminating system comprises, like the polarized light illuminating system as shown in FIG. 14, a polarizing beam splitter 226 of a material having a refractive index of $n_1 = 1.68$, a total reflection prism 229 having a refractive index of $n_2 = 1.52$, a λ/4 optical phase plate 127, and a reflection plate 128, thereby receiving the light having an angle of divergence of about 7° within the polarizing beam splitter 226, but is different from the device of FIG. 14 in that an extinction filter 220 is placed on an emergent surface of the total reflection prism 229.

That is, since the S polarized light component Ls reflected from the action slant plane 226a of the polarizing beam splitter 226 is extinguished with the λ/4 optical phase plate 127 and the reflection plate 128, the P polarized light component Lp reflected from the total reflection slant plane 229a of the total reflection prism 229 is extinguished by the same quantity with the extinction filter 50 and emitted therefrom, so that the unevenness of intensities between the lights Lp and Lp* on a surface of the light bulb, not shown, can be prevented.

Instead of the extinction filter 220, if a light absorbing material, for example, a transition element such as Cr or Mn, is mixed into the material constituting the total reflection prism 229, the prism 229 itself can have the feature of a prism.

Figure 19:
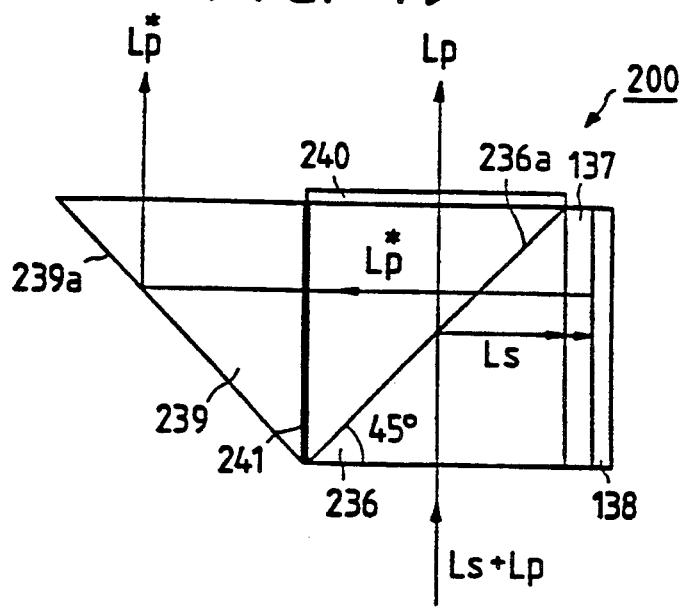
FIG. 19 is a constitutional view showing a tenth example of a polarized light illuminating system according to the present invention.
Figure 20:
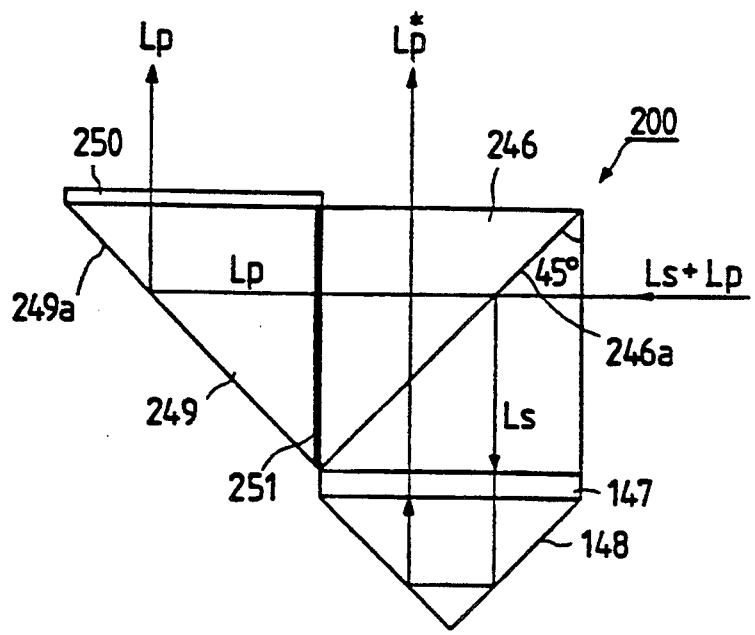
FIG. 20 is a constitutional view showing an eleventh example of a polarized light illuminating system according to the present invention.

FIGS. 19 and 20 are constitutional views showing tenth and eleventh examples of a polarized light illuminating system according to the present invention, respectively.

FIG. 19 shows an example in which an extinction filter 240 is placed on an emergent surface of the polarizing beam splitter 236, in the constitution of the seventh example as shown in FIG. 16, in which the function of a filter 240 is the same as previously described.

FIG. 20 shows an example in which an extinction filter 250 is placed on an emergent surface of the total reflection prism 249, in the constitution of the eighth example as shown in FIG. 17, and as a variation of the example as shown in FIG. 20, if a light absorbing material is mixed into the total reflection prism 249, instead of an extinction filter 250, the prism 249 itself can have the feature of a prism.

In either example of the polarized light illuminating system as shown in FIGS. 19 and 20, the same effects as those for the polarized light illuminating system as shown in FIGS. 16 and 17 can be obtained, and the unevenness of illumination on the light bulb, not shown, can be prevented.

In the conventional polarized light illuminating system as shown in FIG. 3, with the relation ($n_2 < n_1$) between the refractive index $n_1$ for a material of the polarizing beam splitter and the refractive index $n_2$ of the total reflection prism, preferably, such that $0 < n_2/n_1 \leq \cos \omega$ for an angle of divergence $\omega$ of the incident flux, if an extinction filter is placed on an emergent surface of the total reflection prism or a light absorbing material is mixed into the total reflection prism, the same effects as those for this example can be obtained.

As above described, the device of the sixth to eleventh examples as shown in FIGS. 14 to 20, can be applicable to the optical system of illumination for the projection type display unit, like various devices as previously shown. Accordingly, as the polarization converting device 200 of the projection type display unit for displaying color image as shown in FIGS. 13A and 13B, any of the sixth to eleventh examples is applicable.

These polarization converting device can convert the parallel white light emitted from the light source 20 into the linear polarized light, without loss, so that the effect of improving the utilization efficiency of light can be obtained. Also, the back focus of the projection lens system 113 can be significantly reduced as compared with the conventional projection type display unit of this type, because the light flux for each color can be separated and built up by using the cross-dye-chroic prism 112, so that the effects of extending the degree of freedom in designing the projection lens 113 and making the whole of projection type display unit more compact can be provided.

In the sixth to eleventh examples of the present invention as shown in FIGS. 14 to 20, a birefringent crystal or birefringent liquid crystal element can be used as an λ/4 optical phase plate.

Also, in the sixth to eleventh examples, when an adhesive is used to bond an emergent surface of one prism of polarizing beam splitter and an incident surface of the total reflection prism, the refractive index of the adhesive is set to be almost equal to one of the refractive indices for the prism of polarizing beam splitter or the total reflection prism.

By combining the polarized light illuminating system shown in the sixth to eleventh examples with the wedge lenses 14 and 15 as shown in FIG. 3, the projection type display unit using a transmission type liquid crystal light bulb 7 as shown in FIG. 3 can be constituted. Moreover, in the projection type display unit as shown in FIGS. 1 and 2, the polarization converting device of the examples can be inserted between the condenser lens 4 and the polarizing plate 5, or between the condenser lens 4 and the polarizing beam splitter 6.

What is claimed is:

1. A device for converting a light from a light source into a polarized light, comprising:
   a first prism having a first slant plane for receiving the light from said light source and dividing it into first and second lights with their polarized planes orthogonal, a first emergent surface from which said first light exits, and a second emergent surface from which said second light exits;
   a second prism having an incident surface opposed to said second emergent surface of said first prism, a second slant plane for reflecting said second light from said incident surface so as to direct it to an optical path almost parallel to that of said first light, and a third emergent surface from which said second light reflected from said second slant plane exits; and
   a transparent layer provided between said second emergent surface of said first prism and said incident surface of said second prism, said transparent layer having a smaller refractive index than said first prism.

2. A device according to claim 1, wherein said transparent layer includes a thin air layer.

3. A device according to claim 1, wherein said transparent layer includes an optical thin film.

4. A device according to claim 3, wherein said optical thin film has a multi-layer film structure.

5. A device according to claim 1, further comprising a polarized plane modulation member on at least one optical path of said first light and said second light to make polarized planes for said first light and said second light almost coincident.

6. A device according to claim 5, wherein said modulation member comprises a ½ wavelength plate, said ½ wavelength plate being provided on one optical path of said first light and said second light, and allowing a polarized direction of one of said first light and said second light to be rotated approximately 90°.

7. A device according to claim 6, wherein said ½ wavelength plate comprises a ¼ wavelength plate and a mirror to rotate a polarized direction while reflecting said one light.

8. A device according to claim 6, wherein said ½ wavelength plate comprises a birefringent crystal.

9. A device according to claim 6, wherein said ½ wavelength plate comprises a liquid crystal element.

10. A device for converting a light from a light source into a polarized light, comprising:
    a first prism having a first slant plane for receiving the light from said light source and dividing it into first and second lights with their polarized planes orthogonal, a first emergent surface from which said first light exits, and a second emergent surface from which said second light exits;
    a second prism having an incident surface substantially in contact with said second emergent surface of said first prism, a second slant plane for reflecting said second light from said incident surface so as to direct it to an optical path almost parallel to that of said first light, and a third emergent surface from which said second light reflected from said second slant plane exits, and wherein said second prism has a smaller refractive index than said first prism.

11. A device according to claim 10, further comprising a polarized plane modulation member on at least one optical path of said first light and said second light to make polarized planes for said first light and said second light almost coincident.

12. A device according to claim 11, wherein said modulation member comprises a ½ wavelength plate, said ½ wavelength plate being provided on one optical path of said first light and said second light, and allowing a polarized direction of one of said first light and said second light to be rotated approximately 90°.

13. A device according to claim 12, wherein said ½ wavelength plate comprises a ¼ wavelength plate and a mirror to rotate a polarized direction while reflecting said one light.

14. A device according to claim 12, wherein said ½ wavelength plate comprises a birefringent crystal.

15. A device according to claim 12, wherein said ½ wavelength plate comprises a liquid crystal element.

16. A device for converting a light from a light source into a polarized light, comprising:
    a light source;
    a first prism having a first slant plane for receiving the light from said light source and dividing it into first and second lights with their polarized planes orthogonal, a first emergent surface from which said first light exits, and a second emergent surface from which said second light exits;
    a second prism having an incident surface opposed to said second emergent surface of said first prism, a second slant plane for reflecting said second light from said incident surface so as to direct it to an optical path almost parallel to that of said first light, and a third emergent surface from which said second light reflected from said second slant plane exits;

modulation means for modulating at least one polarized plane of said first light and said second light to make the polarized plane of said first light and said second light almost coincident; and a transparent layer provided between said second emergent surface of said first prism and said incident surface of said second prism, said transparent layer having a smaller refractive index than said first prism.

17. A device according to claim 16, wherein said transparent layer includes a thin air layer.

18. A device according to claim 16, wherein said transparent layer includes an optical thin film.

19. A device according to claim 18, wherein said optical thin film has a multi-layer film structure.

20. A device according to claim 16, wherein said modulation member comprises a $\frac{1}{2}$ wavelength plate, said $\frac{1}{2}$ wavelength plate being provided on one optical path of said first light and said second light, and allowing a polarized direction of one of said first light and said second light to be rotated approximately 90°.

21. A device according to claim 20, wherein said $\frac{1}{2}$ wavelength plate comprises a $\frac{1}{4}$ wavelength plate and a mirror to rotate a polarized direction while reflecting said one light.

22. A device according to claim 20, wherein said $\frac{1}{2}$ wavelength plate comprises a birefringent crystal.

23. A device according to claim 20, wherein said $\frac{1}{2}$ wavelength plate comprises a liquid crystal element.

24. A device according to claim 16, further comprising an extinction filter provided on one optical path of said first light and said second light to make the intensity of said first light and said second light almost coincident with each other.

25. A device according to claim 16, further comprising a light absorption material mixed into one of said first prism and said second prism to make the intensity of said first light and said second light almost coincident with each other.

26. A polarized light illuminating system, comprising:
a light source;
a first prism having a first slant plane for receiving the light from said light source and dividing it into first and second lights with their polarized planes orthogonal, a first emergent surface from which said first light exits, and second emergent surface from which said second light exits;
a second prism having an incident surface substantially in contact with said second emergent surface of said first prism, a second slant plane for reflecting said second light from said incident surface so as to direct it to an optical path almost parallel to that of said first light, and a third emergent surface from which said second light reflected from said second slant plant exits, wherein said second prism has a smaller refractive index than said first prism; and
modulation means for modulating at least one polarized plane of said first light and said second light to make the polarized plane of said first light and said second light almost coincident.

27. A device according to claim 26, wherein said modulation member comprises a $\frac{1}{2}$ wavelength plate, said $\frac{1}{2}$ wavelength plate being provided on one optical path of said first light and said second light, and allowing a polarized direction of one of said first light and said second light to be rotated approximately 90°.

28. A device according to claim 27, wherein said $\frac{1}{2}$ wavelength plate comprises a $\frac{1}{4}$ wavelength plate and a mirror to rotate a polarized direction while reflecting said one light.

29. A device according to claim 27, wherein said $\frac{1}{2}$ wavelength plate comprises a birefringent crystal.

30. A device according to claim 27, wherein said $\frac{1}{2}$ wavelength plate comprises a liquid crystal element.

31. A device according to claim 26, further comprising a light attenuation filter provided on one optical path of said first light and said second light to make the intensity of said first light and said second light almost coincident with each other.

32. A device according to claim 26, further comprising a light absorption material mixed into one of said first prism and said second prism to make the intensity of said first light and said second light almost coincident with each other.

33. An image display unit comprising:
a light source;
an illumination optical system including,
a first prism having a first slant plane for receiving the light from said light source and dividing it into first and second lights with their polarized planes orthogonal, a first emergent surface from which said first light exits, and a second emergent surface from which said second light exits; and
a second prism having an incident surface opposed to said second emergent surface of said first prism, a second slant plane for reflecting said second light from said incident surface so as to direct it to an optical path almost parallel to that of said first light, and a third emergent surface from which said second light reflected from said second slant plane exits;
modulation means for modulating at least one polarized plane of said first light and said second light to make the polarized plane of said first light and said second light almost coincident;
a transparent layer provided between said second emergent surface of said first prism and said incident surface of said second prism, said transparent layer having a smaller refractive index than said first prism; and
means for producing an image by modulating said first light and said second light from said illuminating optical system.

34. A unit according to claim 33, further comprising a projecting optical system for projecting said image on to a screen.

35. A unit according to claim 33, wherein said transparent layer includes a thin air layer.

36. A unit according to claim 33, wherein said transparent layer includes an optical thin film.

37. A unit according to claim 36, wherein said optical thin film has a multi-layer film structure.

38. A unit according to claim 33, wherein said modulation member comprises a $\frac{1}{2}$ wavelength plate, said $\frac{1}{2}$ wavelength plate being provided on one optical path of said first light and said second light, and allowing a polarized direction of one of said first light and said second light to be rotated approximately 90°.

39. A unit according to claim 38, wherein said $\frac{1}{2}$ wavelength plate comprises a $\frac{1}{4}$ wavelength plate and a mirror to rotate a polarized direction while reflecting said one light.

40. A unit according to claim 38, wherein said ½ wavelength plate comprises a birefringent crystal.

41. A unit according to claim 38, wherein said ½ wavelength plate comprises a liquid crystal element.

42. A unit according to claim 38, further comprising an extinction filter provided on one optical path of said first light and said second light to make the intensity of said first light and said second light almost coincident with each other.

43. A unit according to claim 38, further comprising a light absorption material mixed into one of said first prism and said second prism to make the intensity of said first light and said second light almost coincident with each other.

44. An image display unit comprising:
a light source;
an illumination optical system including,
  a first prism having a first slant plane for receiving the light from said light source and dividing it into first and second lights with their polarized planes orthogonal, a first emergent surface from which said first light exits, and a second emergent surface from which said second light exits; and
  a second prism having an incident surface substantially in contact with said second emergent surface of said first prism, a second slant plane for reflecting said second light from said incident surface so as to direct it to an optical path almost parallel to that of said first light, and a third emergent surface from which said second light reflected at said second slant plane exits, and wherein said second prism has a smaller refractive index than said first prism;
modulation means for modulating at least one polarized plane of said first light and said second light to make the .polarized plane of said first light and said second light almost coincident; and
means for producing an image by modulating said first light and said second light from said illuminating optical system.

45. A unit according to claim 44, further comprising a projecting optical system for projecting said image on to a screen.

46. A unit according to claim 44, wherein said modulation member comprises a ½ wavelength plate, said ½ wavelength plate being provided on one optical path of said first light and said second light, and allowing a polarized direction of one of said first light and said second light to be rotated approximately 90°.

47. A unit according to claim 46, wherein said ½ wavelength plate comprises a ¼ wavelength plate and a mirror to rotate a polarized direction while reflecting said one light.

48. A unit according to claim 46, wherein said ½ wavelength plate comprises a birefringent crystal.

49. A unit according to claim 46, wherein said ½ wavelength plate comprises a liquid crystal element.

50. A unit according to claim 45, further comprising an extinction filter provided on one optical path of said first light and said second light to make the intensity of said first light and said second light almost coincident with each other.

51. A unit according to claim 45, further comprising a light absorption material mixed into one of said first prism and said second prism to make the intensity of said first light and said second light almost coincident with each other.

52. A device for converting a light from a light source into a polarized light, comprising:
a first prism having a first slant plane for receiving the light from said light source and dividing it into first and second lights with their polarized planes orthogonal, a first emergent surface from which said first light exits and a second emergent surface from which said second light exits;
a second prism having an incident surface substantially in contact with said second emergent surface of said first prism, a second slant plane for reflecting said second light from said incident surface so as to direct it to an optical path substantially parallel to that of said first light, and a third emergent surface from which said second light reflected from said second slant plane exits, wherein said second prism has a refractive index which is different from that of said first prism.

53. An image display unit comprising:
a light source;
an illuminating optical system including,
  a first prism having a first slant plane for receiving light from said light source and dividing it into first and second lights with their polarized planes orthogonal, a first emergent surface from which said first light exits, and a second emergent surface from which said second light exits;
  a second prism having an incident surface substantially in contact with said second emergent surface of said first prism, a second slant plane for reflecting said second light from said incident surface so as to direct it to an optical path substantially parallel to that of said first light, and a third emergent surface from which said second light reflected as said second slant plane exits, said second prism having a refractive index which is different from that of said first prism;
modulation means for modulating at least one polarized plane of said first light and said second light to make the polarized planes of said first light and said second light substantially coincident; and
means for producing an image by modulating said first light and said second light from said illuminating optical system.

54. A polarized light illuminating system, comprising:
a light source;
a first prism having a first slant plane for receiving the light from said light source and dividing it into first and second lights with their polarized planes orthogonal, a first emergent surface from which said first light exits, and a second emergent surface from which said second light exits;
a second prism having an incident surface opposed to said second emergent surface of said first prism, a second slant plane for reflecting said second light from said incident surface, and a third emergent surface from which said second light reflected from said second slant plane exits;
modulation means for modulating at least one polarized plane of said first light and said second light to make the polarized plane of said first light and said second light almost coincident; and
a transparent layer provided between said second emergent surface of said first prism and said incident surface of said second prism, said transparent layer having a smaller refractive index than said first prism.

55. A polarized light illuminating system, comprising:
    a light source;
    a first prism having a first slant plane for receiving the light from said light source and dividing it into first and second lights with their polarized planes orthogonal, a first emergent surface from which said first light exits, and second emergent surface from which said second light exits;
    a second prism having an incident surface substantially in contact with said second emergent surface of said first prism, a second slant plane for reflecting said second light from said incident surface, and a third emergent surface from which said second light reflected from said second slant plane exits;
    wherein said second prism has a refractive index which is different from that of said first prism; and
    modulation means for modulating at least one polarized plane of said first light and said second light to make the polarized plane of said first light and said second light almost coincident.

56. A polarized light illuminating system, comprising:
    a light source;
    a polarization converting unit provided with a first prism at said light source side and a second prism at a illuminated object side on an optical path shaped by said light source wherein said polarization converting unit divides a light from said light source into a first polarized light and a second polarized light which lie in different polarized states to each other, makes a polarized state of said first polarized condition coincide with a polarized state of said second polarized condition and illuminates said illuminated object with said second polarized light; and
    a transparent layer provided on a surface of said second prism, said transparent layer having a smaller refractive index than said second prism.

* * * * *

UNITED STATES PATENT AND TRADEMARK OFFICE
CERTIFICATE OF CORRECTION

PATENT NO. : 5,387,991
DATED : February 7, 1995
INVENTOR(S) : Hideaki Mitsutake, et al.

It is certified that error appears in the above-indentified patent and that said Letters Patent is hereby corrected as shown below:

In Column 1, line 31, "transimtting" should read --transmitting--.
In Column 2, line 45, "Unparallel" should read "unparallel--.
In Column 5, line 60, "Example" should read --example--.
In Column 6, line 13, "he" should read --the--.
In Column 6, line 62, "$\alpha^1$" should read --$\alpha_1$--
In Column 7, line 23, "$\lambda/2$" should read --$\alpha_2$--
In Column 8, line 7, "$\alpha 4$" should read --$\alpha_4$--
In Column 9, line 10, "componnet" should read --component--.
In Column 12, line 62, "130, $\lambda/4$" should read --130, a $\lambda/4$--
In Column 12, line 66, "at a angle" should read --at an angle--.
In Column 13, line 44, "an reflecting" should read --a reflecting--.
In Column 13, line 66, a comma should be placed after "126a";
In Column 13, line 67, the comma should be deleted before the word "and"
In Column 15, line 55, "lp" should read --Lp--.
In Column 18, line 36, "note" should read --noted--
In Column 19, line 29, "Via" should read --via--
In Column 19, line 64, "incontact" should read --in contact--.
In Column 20, line 9, "an reflecting" should read --a reflecting--.
In Column 21, line 14, "$\omega$'" should read --$\omega$',--.
In Column 21, line 25, "$0 < n_2/n_1 \cos \omega (n_1, n_2 > 0)$" should read --$0 < n_2/n_1 \leq \cos \omega (n_1, n_2 > 0)$--.
In Column 21, line 66, "LS" should read --Ls--.
In Column 22, line 7, "LS" should read --Ls--.
In Column 22, line 52, "a angle" should read --an angle--.
In Column 22, line 54, "LS" should read --Ls--.
In Column 22, line 56, "LS" should read --Ls--.
In Column 23, line 1, "an reflecting" should read --a reflecting--.
In Column 23, line 25, "Ls." should read --Ls--.
In Column 24, line 1, $0 < n_2/n_1$." should read --$0 < n_2/n_1$--.
In Column 24, line 59, $0 < n_2/n_1$." should read --$0 < n_2/n_1$--.

UNITED STATES PATENT AND TRADEMARK OFFICE
CERTIFICATE OF CORRECTION

PATENT NO. : 5,387,991

DATED : February 7, 1995

INVENTOR(S) : Hideaki Mitsutake, et al.

It is certified that error appears in the above-indentified patent and that said Letters Patent is hereby corrected as shown below:

In Column 24, line 65, "device" should read --devices--
In Column 32, Claim 56, line 7, "a illuminated " should read --an alluminated--.

Signed and Sealed this

Twenty-eighth Day of November 1995

Attest:

BRUCE LEHMAN

*Attesting Officer*    *Commissioner of Patents and Trademarks*